(12) United States Patent
Marpe et al.

(10) Patent No.: US 8,275,044 B2
(45) Date of Patent: *Sep. 25, 2012

(54) VIDEO FRAME ENCODING AND DECODING

(75) Inventors: Detlev Marpe, Berlin (DE); Heiko Schwarz, Berlin (DE); Thomas Wiegand, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,870

(22) Filed: Feb. 29, 2012

(65) Prior Publication Data
US 2012/0155546 A1    Jun. 21, 2012

Related U.S. Application Data

(62) Division of application No. 12/324,810, filed on Nov. 26, 2008, which is a division of application No. 10/769,403, filed on Jan. 30, 2004, now Pat. No. 7,599,435.

(51) Int. Cl.
*H04N 7/12* (2006.01)
*H04N 11/02* (2006.01)
*H04N 11/04* (2006.01)

(52) U.S. Cl. ......... 375/240.16; 375/240.01; 375/240.12; 375/240.13; 375/240.14

(58) Field of Classification Search . 375/240.12–240.17
See application file for complete search history.

(56) References Cited

U.S. PATENT DOCUMENTS

| | | | |
|---|---|---|---|
| 5,091,782 A | 2/1992 | Krause et al. | |
| 5,140,417 A | 8/1992 | Tanaka et al. | |
| 5,227,878 A | 7/1993 | Puri et al. | |
| 5,272,478 A | 12/1993 | Allen et al. | |
| 5,347,308 A | 9/1994 | Wai | |
| 5,363,099 A | 11/1994 | Allen | |
| 5,434,622 A | 7/1995 | Lim | |
| 5,471,207 A | 11/1995 | Zandi et al. | |
| 5,500,678 A | 3/1996 | Puri et al. | |
| 5,504,530 A | 4/1996 | Obikane et al. | |
| 5,659,631 A | 8/1997 | Gormish et al. | |
| 5,684,539 A | 11/1997 | Boyce et al. | |
| 5,767,909 A | 6/1998 | Jung et al. | |
| 5,818,369 A | 10/1998 | Withers et al. | |

(Continued)

OTHER PUBLICATIONS

"Information Technology—Coding of Audio Visual Objects—Part 2: Visual", International Organization for Standardization, Organization Normalization; N4350; ISO/IEC 14496-2:2001, Sydney, Jul. 2001, 438 pages.

(Continued)

*Primary Examiner* — David Czekaj
*Assistant Examiner* — Chikaodili E Anyikire
(74) *Attorney, Agent, or Firm* — Michael A. Glenn; Glenn Patent Group

(57) ABSTRACT

A video frame arithmetical context adaptive encoding and decoding scheme is presented which is based on the finding, that, for sake of a better definition of neighborhood between blocks of picture samples, i.e. the neighboring block which the syntax element to be coded or decoded relates to and the current block based on the attribute of which the assignment of a context model is conducted, and when the neighboring block lies beyond the borders or circumference of the current macroblock containing the current block, it is important to make the determination of the macroblock containing the neighboring block dependent upon as to whether the current macroblock pair region containing the current block is of a first or a second distribution type, i.e., frame or field coded.

13 Claims, 12 Drawing Sheets

U.S. PATENT DOCUMENTS

| | | | |
|---|---|---|---|
| 5,949,912 | A | 9/1999 | Wu |
| 5,992,753 | A | 11/1999 | Xu |
| 6,075,471 | A | 6/2000 | Kimura et al. |
| 6,222,468 | B1 | 4/2001 | Allen |
| 6,263,115 | B1 | 7/2001 | Cho |
| 6,265,997 | B1 | 7/2001 | Nomizu |
| 6,275,533 | B1 | 8/2001 | Nishi |
| 6,298,160 | B1 | 10/2001 | Goertzen |
| 6,411,231 | B1 | 6/2002 | Yanagiya et al. |
| 6,522,651 | B2 | 2/2003 | Herrmann |
| 6,532,309 | B1 | 3/2003 | Sato et al. |
| 6,574,226 | B1 | 6/2003 | Nakano et al. |
| 6,574,243 | B2 | 6/2003 | Tsunoda et al. |
| 6,603,815 | B2 | 8/2003 | Suzuki et al. |
| 6,646,578 | B1 | 11/2003 | Au |
| 6,674,477 | B1 | 1/2004 | Yamaguchi et al. |
| 6,677,868 | B2 | 1/2004 | Kerofsky et al. |
| 6,771,197 | B1 | 8/2004 | Yedidia |
| 6,795,584 | B2 | 9/2004 | Karczewicz et al. |
| 6,812,873 | B1 | 11/2004 | Siohan et al. |
| 6,927,710 | B2 | 8/2005 | Linzer et al. |
| 6,980,596 | B2 | 12/2005 | Wang et al. |
| 6,987,888 | B2 | 1/2006 | Wang et al. |
| 7,177,475 | B2 | 2/2007 | Wang et al. |
| 2003/0081850 | A1 | 5/2003 | Karczewicz et al. |
| 2003/0099292 | A1 | 5/2003 | Wang et al. |
| 2004/0136461 | A1 | 7/2004 | Kondo et al. |
| 2004/0146109 | A1 | 7/2004 | Kondo et al. |
| 2004/0268329 | A1 | 12/2004 | Prakasam |
| 2005/0053296 | A1 | 3/2005 | Srinivasan et al. |
| 2005/0169374 | A1 | 8/2005 | Marpe et al. |

OTHER PUBLICATIONS

"ISO/IEC 13818-2: 1995 (E) Specification", Recommendation ITU-T H.262, Jul. 1995, 229 pages.

"Sample Data Coding", Chapter 12, May 2001, 473-484.

"The Concept of a Random Variable", Apr. 1996, 82-84.

"Video Codec for Audiovisual Services at px 64 kbit/s", ITU-T International Telecommunication Union, ITU-T Recommendation H.261, Mar. 1993, 30 pages.

Bossen, Frank, "CABAC cleanup and complexity reduction", Joint Video Team of ISO/IEC MPEG & ITU-T VCEG; Document JVT-Exxx, 5th Meeting: Geneva, Switzerland, Oct. 2002, 20 pages.

Choi, Seung-Jong et al., "Motion-Compensated 3-D Subband Coding of Video", IEEE Transactions on Image Processing, vol. 8, No. 2, Feb. 1999, 155-167.

Flierl, Markus et al., "A Locally Optimal Design Algorithm for Block-Based Multi-Hypothesis Motion-Compensated Prediction", Proceedings of the IEEE DCC, Snowbird, Utah, Mar. 1998, 239-248.

Flierl, Markus et al., "Generalized B Pictures and the Draft H.264/AVC Codec", IEEE Transactions on Circuits and Systems for Video Technology, vol. 13(7), Jul. 2003, 587-597.

Gallager, Robert G. et al., "Optimal Source Codes for Geometrically Distributed Integer Alphabets", IEEE Transactions on Information Technology, Mar. 1975, 228-230.

Gonzales, C.A. et al., "DCT Coding for Motion Video Storage using Adaptive Arithmetic Coding", Signal Processing: Image Communication 2 (1960), vol. 2, No. 2, Aug. 1990, 145-154.

Heising, G. et al., "Wavelet-based very low Bitrate coding using image warping", IEEE Proc. Visual Image Signal Process, vol. 148, No. 2, Apr. 2001, 93-101.

Howard, Paul et al., "Practical implementations of arithmetic code", Brown University, Department of Computer Science, Technical Report No. 92-18; Revised version, Formerly Technical Report No. CS-91-45, Apr. 1992, 32 pages.

Karczewicz, Marta et al., "Analysis and Simplification of Intra Prediction", Joint Video Team of ISOIIEC MPEG & ITU-T VCEG; Document JVT-D025, 4th Meeting: Klagenfurt, Austria, Jul. 2002, 8 pages.

Karczewicz, Marta et al., "The SP- and SI-Frames Design for H.264/AVC;", IEEE Transactions on Circuits and Systems for Video Technoloqy, vol. 13, No. 7, Jul. 2003, 637-644.

List, Peter et al., "Adaptive Deblocking Filter", IEEE Transactions on Circuits and Systems for Video Technology, vol. 13, No. 7, Jul. 2003, 614-619.

Malvar, Henrique S. et al., "Low-complexity Transformed Quantization in H.264/AVC", IEEE Transactions on Circuits and Systems for Video Technology, vol. 13, No. 7, Jul. 2003, 598-603.

Marpe, Detlev et al., "Adaptive Codes for H.26L", ITU-T Telecommunications Standardization Sector; Video Coding Experts Group Document; Document VCEG-L13, Twelfth Meetinq: Eibsee, Germany, Jan. 2001, 8 pages.

Marpe, Detlev et al., "Efficient Pre-Coding Techniques for Wavelet-Based Image Compression", Proc. Int. Picture Coding Symposium, Sep. 1997, 45-50.

Marpe, Detlev et al., "Fast Arithmetic Coding for CABAC", Joint Video Team of ISO/IEC MPEG &ITU-T VCEG, Document JVT-C060; 3rd Meeting Fairfax, Virginia, USA, Mar. 2002, 16 pages.

Marpe, Detlev et al., "Final CABAC cleanup", Joint Video Team of ISO/IEC MPEG & ITU-T VCEG, Document JVT-F039; 6th Meetinq: Awaji, Island, JP, Dec. 2002, 24 pages.

Marpe, Detlev et al., "Further Results for CABAC entropy coding scheme", ITU-T Telecommunications Standardization Sector; Video Coding Experts Group Document, Document: VCEG-M59; Thirteenth Meeting: Austin, Texas, USA, Apr. 2001, 8 pages.

Marpe, Detlev et al., "Improved CABAC", ITU-T Telecommunications Standardization Sector; Video Coding Experts Group; Document VCEG-018r1, 15th Meeting: Pattava, Thailand, Dec. 2001, 10 pages.

Marpe, Detlev et al., "New Results on Improved CABAC", Joint Video Team of ISO/IEC MPEG & ITU-T VCEG, Document JVT-B101; 2nd Meeting: Geneva, CH, 2002, 12 pages.

Marpe, Detlev et al., "Proposed Cleanup Changes for CABAC", Joint Video Team of ISO/IEC MPEG & ITU-T VCEG, Document JVT-E059; 5th Meeting: Geneva, CH, Oct. 2002, 8 pages.

Marpe, Detlev et al., "Proposed Editorial Changes and Cleanup of CABAC", Joint Video Team of ISO/IEC MPEG & ITU-T VCEG, Document JVT-D019; 4th Meeting: Klagenfurt, Austria, Jul. 2002, 10 pages.

Marpe, Detlev et al., "Very Low Bit-Rate Video Coding Using Wavelet-Based Techniques", IEEE Transactions on Circuits and Systems for Video Technology, vol. 9, No. 1,, Feb. 1999, 85-94.

Marpe, Detlez et al., "Context-Based Adaptive Binary Arithmetic Coding in the H.264/AVC Video Compression Standard", IEEE Transactions on Circuits and Systems for Video Technology, vol. 13, No. 7,, Jul. 2003, 620-636.

Moffat, A. et al., "Arithmetic Coding Revisited", ACM Transactions on Information Systems, vol. 16, No. 3, Jul. 1998, 256-294.

Mrak, Marta et al., "A Context Modeling Algorithm and its Application in Video Compression", Fraunhofer-Institute HHI, Berlin,Germany, Apr. 1999, 4 pages.

Pennebaker, W B. et al., "An overview of the basic principles of the Q-Coder adaptive binary arithmetic coder", IBM. J. Res. Develop, vol. 32, No. 6,, Nov. 1988, 717-726.

Puri, Atul et al., "Adaptive frame/field motion compensated video coding", Signal Processing Image Communication, vol. 5, No. 1/02, Feb. 1, 1993, 39-58.

Ribas-Cobera, Jordi et al., "A Generalized Hypothetical Reference Decoder for H.264/AVC", IEEE Transactions on Circuits and Systems for Video Technology, vol. 13, No. 7, Jul. 2003, 674-687.

Rissanen, Jorma et al., "A multiplication-free multialphabet arithmetic code", IEEE Transactions on Communications, vol. 37, No. 2, Feb. 1989, 93-98.

Rissanen, Jorma , "Universal Coding, Information, Prediction, and Estimation", IEEE Transactions on Information Theory, vol. IT-30, No. 4, Jul. 1984, 629-636.

Rissanen, Jorma et al., "Universal Modeling and Coding", IEEE Transactions on Information Theory, vol. IT-27 No. 1, Jan. 1981, 12-23.

Said, Amir et al., "A new fast and efficient image codec based on set partitioning in hierarchical trees", IEEE Transactions on Circuits and Systems for Video Technology, Chicago, IL, May 1993, 16 pages.

Schwarz, Heiko et al., "CABAC and Slices", Joint Video Team of ISO/IEC MPEG & ITU-T, VCEG; Document JVT-D020r1; 4th Meeting: Klagenfurt, Austria, Jul. 2002, 18 pages.

Schwarz, Heiko et al., "Improved CABAC", Joint Video Team of ISO/IEC MPEG & ITU-T, VCEG; Document JVT-C060; 3rd Meeting: Fairfax, Virginia, USA, May 2002, 14 pages.

Stockhammer, Thomas et al., "H.264/AVC in Wireless Environments", IEEE Transactions on Circuits and Systems for Video Technoloqy, vol. 13, No. 7, Jul. 2003, 657-673.

Sullivan, Gary, "Draft Text of Recommendation H.263 Version 2 ("H.263+") for Decision", Study Group 16—Contribution COM-999, Study Period, 1997-2000, 153 pages.

Teuhola, Jukka , "A Compression Method of Clustered Bit-Vectors", Information Processing Letters, vol. 7, No. 6, Oct. 1978, 308-311.

Wedi, Thomas et al., "Motion—and Aliasing—Compensated Prediction for Hybrid Video Coding", IEEE Transactions on Circuits and Systems for Video Technology, vol. 13, No., Jul. 7, 2003, 577-586.

Weinberger, Marcelo J. et al., "Applications of Universal Context Modeling to Lossless Compression of Gray-Scale Images", IEEE Transactions on Imaging Processing, vol. 5, No. 4, Apr. 1996, 575-586.

Wenger, Stephen , "H.264/AVC Over IP", IEEE Transactions on Circuits and Systems for Video Technology, vol. 13, No. 7, Jul. 2003, 645-656.

Wiegand, Thomas et al., "Draft ITU-T Recommendation and Final Draft International Standard of Joint Video Specification", AVC Joint Video Team of ISO/IEC MPEG & ITU-T VCEG, ITU-T Rec. H.264: ISO/IEC 14496-10; 8th Meeting: Geneva, Switzerland., May 2003.

Wiegand, Thomas , "Draft ITU-T Recommendation and Final Draft International Standard of Joint Video Specification (ITU-T Rec. H.264; ISO/IEC; 14496-10 AVC)", Document: JVTG050; 7th Meeting, 7th Meeting: Pattaya,Thailand, Mar. 2003, 268 pages.

Wiegand, Thomas et al., "Long Term Memory Motion-Compensated Prediction", IEEE Transactions on Circuits and Systems of Video Technology, vol. 9, No. 1, Feb. 1999, 70, 75, 77, 79, 81-84.

Wiegand, Thomas et al., "Overview of the H.264/AVC Video Coding Standard", IEEE Transaction on Circuit and Systems for Video Technology, vol. 13, No. 7, Jul. 2003, 560-576.

Wiegand, Thomas et al., "Rate-Constrained Coder Control and Comparison of Video Coding Standards", IEEE Transactions on Circuits and Systems for Video Technology, vol. 13, No. 7, Jul. 2003, 688-703.

Wiegand, Thomas , "Study of Final Committee Draft of Joint Video Specification (ITU-T Rec. H.264, ISOIIEC 14496-10 AVCO)", Joint Video Team of ISO/IEC MPEG & ITU-T VCEG, Document JVT-F100D2; 6th Meeting: Awaji, Island, JP, Dec. 2002, 260 pages.

| xN | yN | currMbFrameFlag | mbIsTopMbFlag | mbAddrX | mbAddrXFrameFlag | additional condition | mbAddrN | yM |
|---|---|---|---|---|---|---|---|---|
| <0 | 0...16 | 1 | 1 | mbAddrA | 1 |  | mbAddrA | yN |
|  |  |  |  |  | 0 | yN % 2 ==0 | mbAddrA | yN>>1 |
|  |  |  |  |  |  | yN % 2 !=0 | mbAddrA+1 | yN>>1 |
|  |  |  | 0 | mbAddrA | 1 |  | mbAddrA+1 | yN |
|  |  |  |  |  | 0 | yN % 2 ==0 | mbAddrA | (yN+8)>>1 |
|  |  |  |  |  |  | yN % 2 !=0 | mbAddrA+1 | (yN+8)>>1 |
|  |  | 0 | 1 | mbAddrA | 1 | yN<8 | mbAddrA | yN<<1 |
|  |  |  |  |  |  | yN>=8 | mbAddrA+1 | (yN<<1)-8 |
|  |  |  |  |  | 0 |  | mbAddrA | yN |
|  |  |  | 0 | mbAddrA | 1 | yN<8 | mbAddrA | (yN<<1)+1 |
|  |  |  |  |  |  | yN>=8 | mbAddrA+1 | (yN<<1)+1-8 |
|  |  |  |  |  | 0 |  | mbAddrA+1 | yN |
| 0...16 | <0 | 1 | 1 | mbAddrB | 1 |  | mbAddrB+1 | yN |
|  |  |  |  |  | 0 |  | CurrMbAddr-1 | yN |
|  |  |  |  | CurrMbAddr |  |  |  |  |
|  |  |  | 0 | mbAddrB | 1 |  | mbAddrB+1 | 2*yN |
|  |  |  |  |  | 0 |  | mbAddrB | yN |
|  |  | 0 |  | mbAddrB |  |  | mbAddrB+1 | yN |
| 0...16 | 0...16 |  |  | CurrMbAddr |  |  | CurrMbAddr | yN |

FIG 8

VIDEO FRAME ENCODING AND DECODING

This application is a divisional of U.S. patent application Ser. No. 12/324,810, filed Nov. 26, 2008, which is a divisional of U.S. patent application Ser. No. 10/769,403, filed Jan. 30, 2004, now U.S. Pat. No. 7,599,435, all of which are incorporated herein in their entirety by this reference thereto.

BACKGROUND OF THE INVENTION

I. Technical Field of the Invention

The present invention is related to video frame coding and, in particular, to an arithmetic coding scheme using context assignment based on neighboring syntax elements.

II. Description of the Prior Art

Entropy coders map an input bit stream of binarizations of data values to an output bit stream, the output bit stream being compressed relative to the input bit stream, i.e., consisting of less bits than the input bit stream. This data compression is achieved by exploiting the redundancy in the information contained in the input bit stream.

Entropy coding is used in video coding applications. Natural camera-view video signals show non-stationary statistical behavior. The statistics of these signals largely depend on the video content and the acquisition process. Traditional concepts of video coding that rely on mapping from the video signal to a bit stream of variable length-coded syntax elements exploit some of the non-stationary characteristics but certainly not all of it. Moreover, higher-order statistical dependencies on a syntax element level are mostly neglected in existing video coding schemes. Designing an entropy coding scheme for video coder by taking into consideration these typical observed statistical properties, however, offer significant improvements in coding efficiency.

Entropy coding in today's hybrid block-based video coding standards such as MPEG-2 and MPEG-4 is generally based on fixed tables of variable length codes (VLC). For coding the residual data in these video coding standards, a block of transform coefficient levels is first mapped into a one-dimensional list using an inverse scanning pattern. This list of transform coefficient levels is then coded using a combination of run-length and variable length coding. The set of fixed VLC tables does not allow an adaptation to the actual symbol statistics, which may vary over space and time as well as for different source material and coding conditions. Finally, since there is a fixed assignment of VLC tables and syntax elements, existing inter-symbol redundancies cannot be exploited within these coding schemes.

It is known, that this deficiency of Huffman codes can be resolved by arithmetic codes. In arithmetic codes, each symbol is associated with a respective probability value, the probability values for all symbols defining a probability estimation. A code word is coded in an arithmetic code bit stream by dividing an actual probability interval on the basis of the probability estimation in several sub-intervals, each sub-interval being associated with a possible symbol, and reducing the actual probability interval to the sub-interval associated with the symbol of data value to be coded. The arithmetic code defines the resulting interval limits or some probability value inside the resulting probability interval.

As may be clear from the above, the compression effectiveness of an arithmetic coder strongly depends on the probability estimation as well as the symbols, which the probability estimation is defined on.

A special kind of context-based adaptive binary arithmetic coding, called CABAC, is employed in the H.264/AVC video coding standard. There was an option to use macroblock adaptive frame/field (MBAFF) coding for interlaced video sources. Macroblocks are units into which the pixel samples of a video frame are grouped. The macroblocks, in turn, are grouped into macroblock pairs. Each macroblock pair assumes a certain area of the video frame or picture. Furthermore, several macroblocks are grouped into slices. Slices that are coded in MBAFF coding mode can contain both, macroblocks coded in frame mode and macroblocks coded in field mode. When coded in frame mode, a macroblock pair is spatially sub-divided into a top and a bottom macroblock, the top and the bottom macroblock comprising both pixel samples captured at a first time instant and picture samples captured at the second time instant being different from the first time instant. When coded in field mode, the pixel samples of a macroblock pair are distributed to the top and the bottom macroblock of the macroblock pair in accordance with their capture time.

The introduction of MBAFF coding to the precoding stage as an alternative to PAFF (picture adaptive frame/field) coding where the decisions between frame and field coding are made for each frame as a hole, was motivated by the fact that if a frame consists of mixed regions where some regions are moving and others are not, it is typically more efficient to code the non-moving regions in frame mode and the moving regions in the field mode.

As mentioned above, in the H.264/AVC video coding standard, there is an option to use macroblock adaptive frame/field coding (MBAFF) for interlaced video sources. As turned out from the above considerations, in MBAFF, the pixel samples in a respective macroblock pair are distributed in different ways to the top end field macroblock, depending on the macroblock pair being frame or field coded. Thus, on the one hand, when MBAFF mode is active, the neighborhood between pixel samples of neighboring is somewhat complicated compared to the case of PAFF coding mode.

On the other hand, the CABAC entropy coding scheme tries to exploit statistical redundancies between the values of syntax elements of neighboring blocks. That is, for the coding of the individual binary decisions, i.e., bins, of several syntax elements, context variables are assigned depending on the values of syntax elements of neighboring blocks located to the left of and above the current block. In this document, the term "block" is used as collective term that can represent 4×4 luma or chroma blocks used for transform coding, 8×8 luma blocks used for specifying the coded block pattern, macroblocks, macroblock or sub-macroblock partitions used for motion description.

In the case of macroblock adaptive frame/field coding, while the neighborhoods that are used for CABAC are not clear since field and frame macroblocks can be mixed inside the picture or slice. In the solution to this problem that was included in older versions of the H.264/AVC, each macroblock pair was considered as frame macroblock pair for the purpose of context modeling in CABAC. However, with this concept, the coding efficiency could be degraded, since choosing neighboring blocks that do not adjoin to the current blocks affects the adaption of the conditional probability models.

SUMMARY OF THE INVENTION

It is the object of the present invention to provide a video coding scheme, which enables a higher compression effectiveness.

In accordance with the first aspect of the present invention, this object is achieved by a method for encoding a video signal representing at least one video frame, with at least one video frame being composed of picture samples, the picture samples belonging either to a first or a second field being captured at different time instants, the video frame being spatially divided up into macroblock pair regions, each macroblock pair region being associated with a top and bottom macroblock, the method comprising the steps of deciding, for each macroblock pair region, as to whether same is of a first or a second distribution type; assigning, for each macroblock pair region, each of the pixel samples in the respective macroblock pair region to a respective one of the top and bottom macroblock of the respective macroblock pair region, in accordance with the distribution type of the respective macroblock pair region, and pre-coding the video signal into a pre-coded video signal, the pre-coding comprising the sub-step of pre-coding a current macroblock of the top and bottom macroblock associated with a current macroblock pair region of the macroblock pair regions to obtain a current syntax element. Thereafter, it is determined, for the current syntax element, a neighboring macroblock at least based upon as to whether the current macroblock pair region is of a first or second distribution type. One of at least two context models is assigned to the current syntax element based on a pre-determined attribute of the neighboring macroblock, wherein each context model is associated with a different probability estimation. Finally, arithmetically encoding the syntax element into a coded bit stream based on the probability estimation with which the assigned context model is associated.

In accordance with the second aspect of the present invention, this object is achieved by a method for decoding a syntax element from a coded bit stream, the coded bit stream being an arithmetically encoded version of a pre-coded video signal, the pre-coded video signal being a pre-coded version of a video signal, the video signal representing at least one video frame being composed of picture samples, the picture samples belonging either to a first or a second field being captured at a different time instants, the video frame being spatially divided up into macroblock pair regions, each macroblock pair region being associated with a top and a bottom macroblock, each macroblock pair region being either of a first or a second distribution type, wherein, for each macroblock pair region, each of the pixel samples in the respective macroblock pair region is assigned to a respective one of the top and bottom macroblock of the respective macroblock pair region in accordance with the distribution type of the respective macroblock pair region, wherein the syntax element relates to a current macroblock of the top and bottom macroblock of a current macroblock pair region of the macroblock pair regions. The method comprises determining, for the current syntax element, a neighboring macroblock at least based upon as to whether the current macroblock pair region is of a first or a second distribution type; assigning one of at least two context models to the current syntax element based on a predetermined attribute of the neighboring macroblock, wherein each context model is associated with a different probability estimation; and arithmetically decoding the syntax element from the coded bit stream based on the probability estimation with which the assigned context model is associated.

In accordance with the third aspect of the present invention, this object is achieved by an Apparatus for encoding a video signal representing at least one video frame, with at least one video frame being composed of picture samples, the picture samples belonging either to a first or a second field being captured at different time instants, the video frame being spatially divided up into macroblock pair regions, each macroblock pair region being associated with a top and bottom macroblock, the apparatus comprising means for deciding, for each macroblock pair region, as to whether same is of a first or a second distribution type; means for assigning, for each macroblock pair region, each of the pixel samples in the respective macroblock pair region to a respective one of the top and bottom macroblock of the respective macroblock pair region, in accordance with the distribution type of the respective macroblock pair region; means for pre-coding the video signal into a pre-coded video signal, the pre-coding comprising the sub-step of pre-coding a current macroblock of the top and bottom macroblock associated with a current macroblock pair region of the macroblock pair regions to obtain a current syntax element; means for determining, for the current syntax element, a neighboring macroblock at least based upon as to whether the current macroblock pair region is of a first or second distribution type; means for assigning one of at least two context models to the current syntax element based on a pre-determined attribute of the neighboring macroblock, wherein each context model is associated with a different probability estimation; and means for arithmetically encoding the syntax element into a coded bit stream based on the probability estimation with which the assigned context model is associated.

In accordance with the forth aspect of the present invention, this object is achieved by an apparatus method for decoding a syntax element from a coded bit stream, the coded bit stream being an arithmetically encoded version of a pre-coded video signal, the pre-coded video signal being a pre-coded version of a video signal, the video signal representing at least one video frame being composed of picture samples, the picture samples belonging either to a first or a second field being captured at a different time instants, the video frame being spatially divided up into macroblock pair regions, each macroblock pair region being associated with a top and a bottom macroblock, each macroblock pair region being either of a first or a second distribution type, wherein, for each macroblock pair region, each of the pixel samples in the respective macroblock pair region is assigned to a respective one of the top and bottom macroblock of the respective macroblock pair region in accordance with the distribution type of the respective macroblock pair region, wherein the syntax element relates to a current macroblock of the top and bottom macroblock of a current macroblock pair region of the macroblock pair regions, wherein the apparatus comprises means for determining, for the current syntax element, a neighboring macroblock at least based upon as to whether the current macroblock pair region is of a first or a second distribution type; means for assigning one of at least two context models to the current syntax element based on a predetermined attribute of the neighboring macroblock, wherein each context model is associated with a different probability estimation; and mean for arithmetically decoding the syntax element from the coded bit stream based on the probability estimation with which the assigned context model is associated.

The present invention is based on the finding that when, for whatever reason, such as the better effectiveness when coding video frames having non-moving regions and moving regions, macroblock pair regions of a first and a second distribution type, i.e., field and frame coded macroblock pairs, are used concurrently in a video frame, i.e. MBAFF coding is used, the neighborhood between contiguous blocks of pixel samples has to be defined in a way different from considering each macroblock pair as frame macroblock pair for the purpose of context modeling and that the distance of areas covered by a neighboring and a current block could be very large when considering each macroblock pair as a frame macroblock pair. This in turn, could degrade the coding efficiency, since choosing neighboring blocks that are not arranged nearby the current block affects the adaption of the conditional probability models.

Further, the present invention is based on the finding, that, for sake of a better definition of neighborhood between blocks of picture samples, i.e. the neighboring block which the syntax element to be coded or decoded relates to and the current block based on the attribute of which the assignment of a context model is conducted, and when the neighboring block lies beyond the borders or circumference of the current macroblock containing the current block, it is important to make the determination of the macroblock containing the neighboring block dependent upon as to whether the current macroblock pair region containing the current block is of a first or a second distribution type, i.e., frame or field coded.

The blocks may be a macroblock or some sub-part thereof. In both cases, the determination of a neighboring block comprises at least the determination of a neighboring macroblock as long as the neighboring block lies beyond the borders of the current macroblock.

SHORT DESCRIPTION OF THE DRAWINGS

Preferred embodiments of the present invention are described in more detail below with respect to the figures.

FIG. 8 shows a table illustrating how to obtain the macroblock address mbAddrN indicating the macroblock containing a sample having coordinates xN and yN relative to the upper-left sample of a current macroblock and, additionally, the y coordinate yM for the sample in the macroblock mbAddrN for that sample, dependent on the sample being arranged beyond the top or the left border of the current macroblock, the current macroblock being frame or field coded, and the current macroblock being the top or the bottom macroblock of the current macroblock pair, and, eventually, the macroblock mbAddrA being frame or field coded and the line in which the sample lies having an odd or even line number yN.

Figure 9:
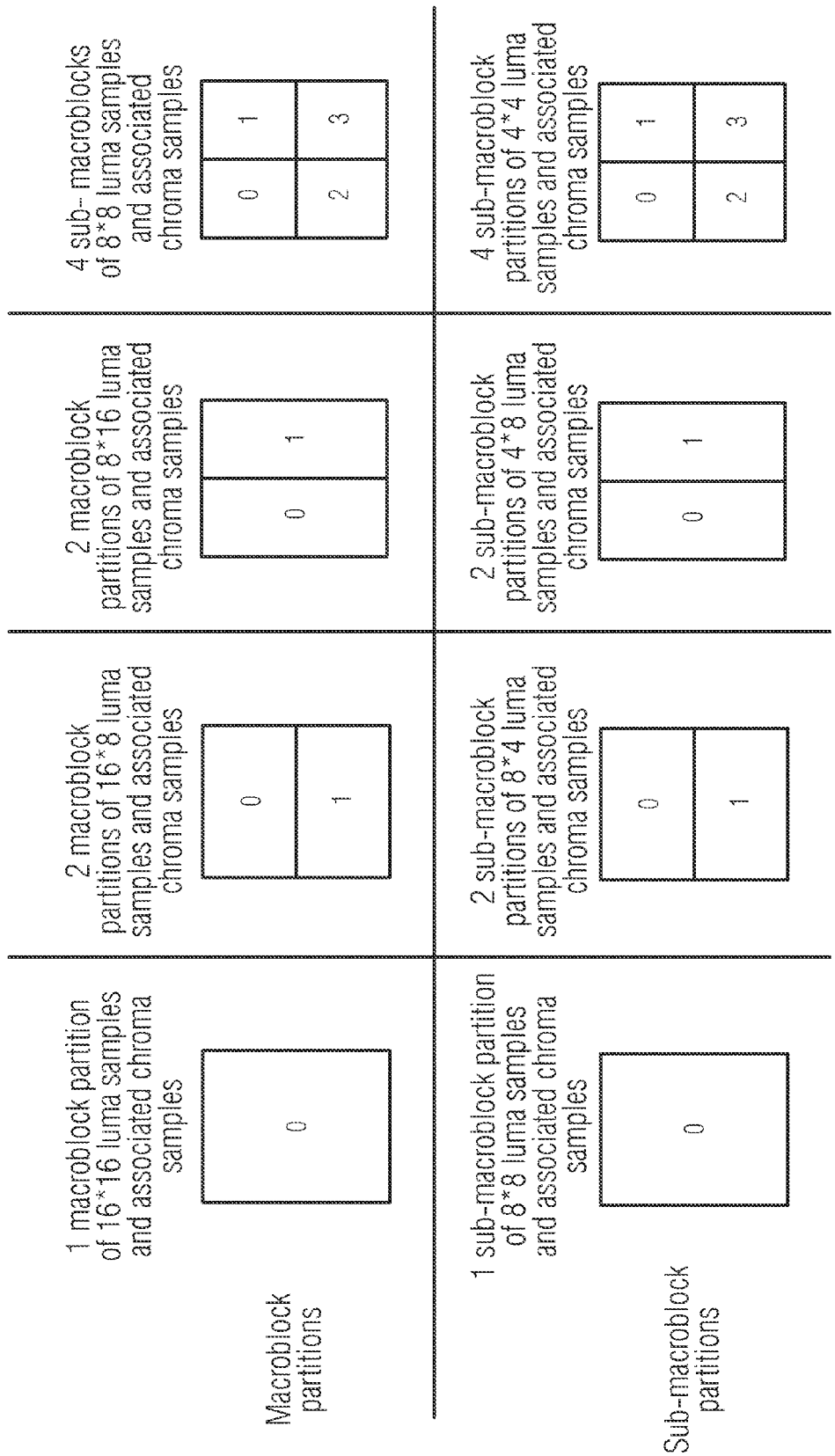

FIG. 9 shows a schematic illustrating macroblock partitions, sub-macroblock partitions, macroblock partitions scans, and sub-macroblock partition scans.

Figure 10:
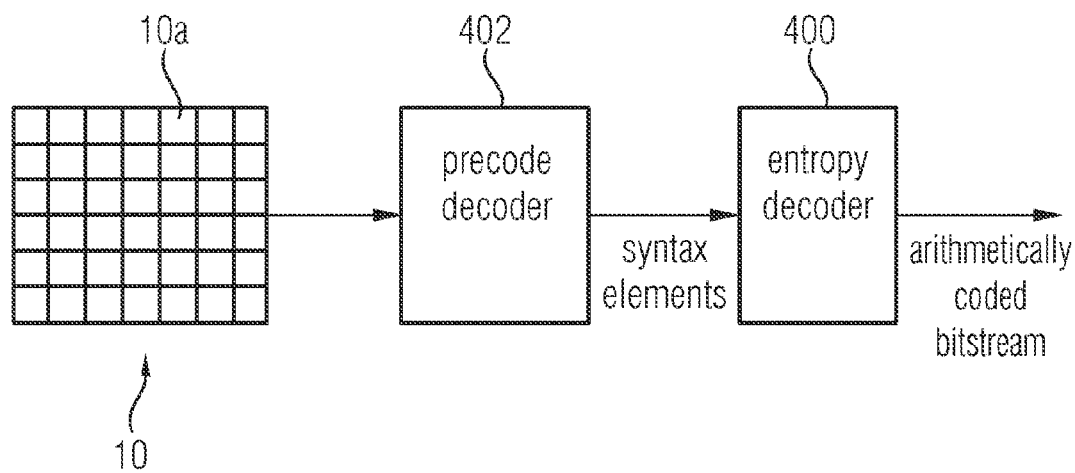

FIG. 10 shows a high-level block diagram of a decoding environment in which the present invention may be employed.

Figure 5:
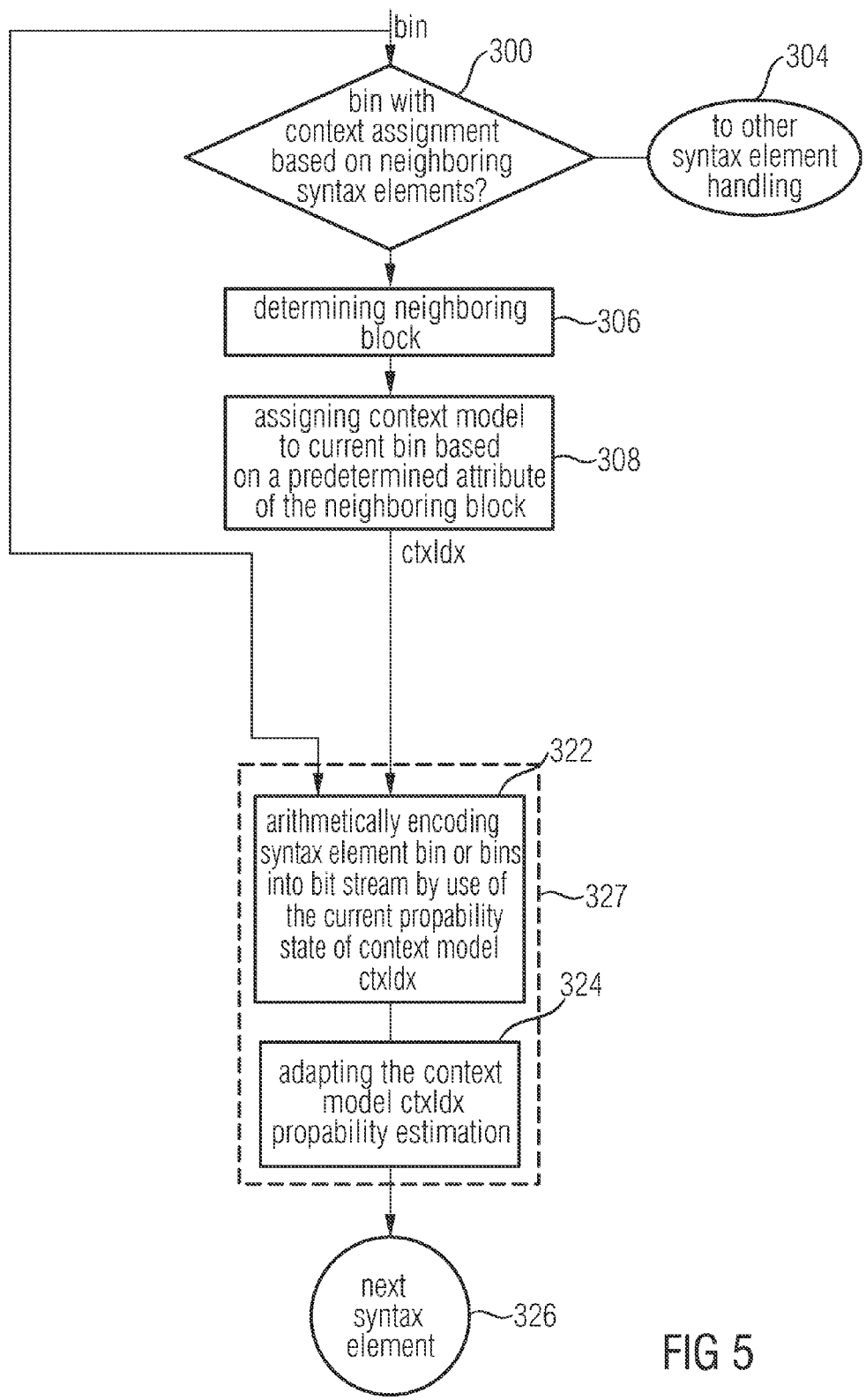
FIG. 5 shows a flow diagram illustrating the encoding of syntax elements with context assignments based on neighboring syntax elements in accordance with an embodiment of the present invention.
Figure 6:
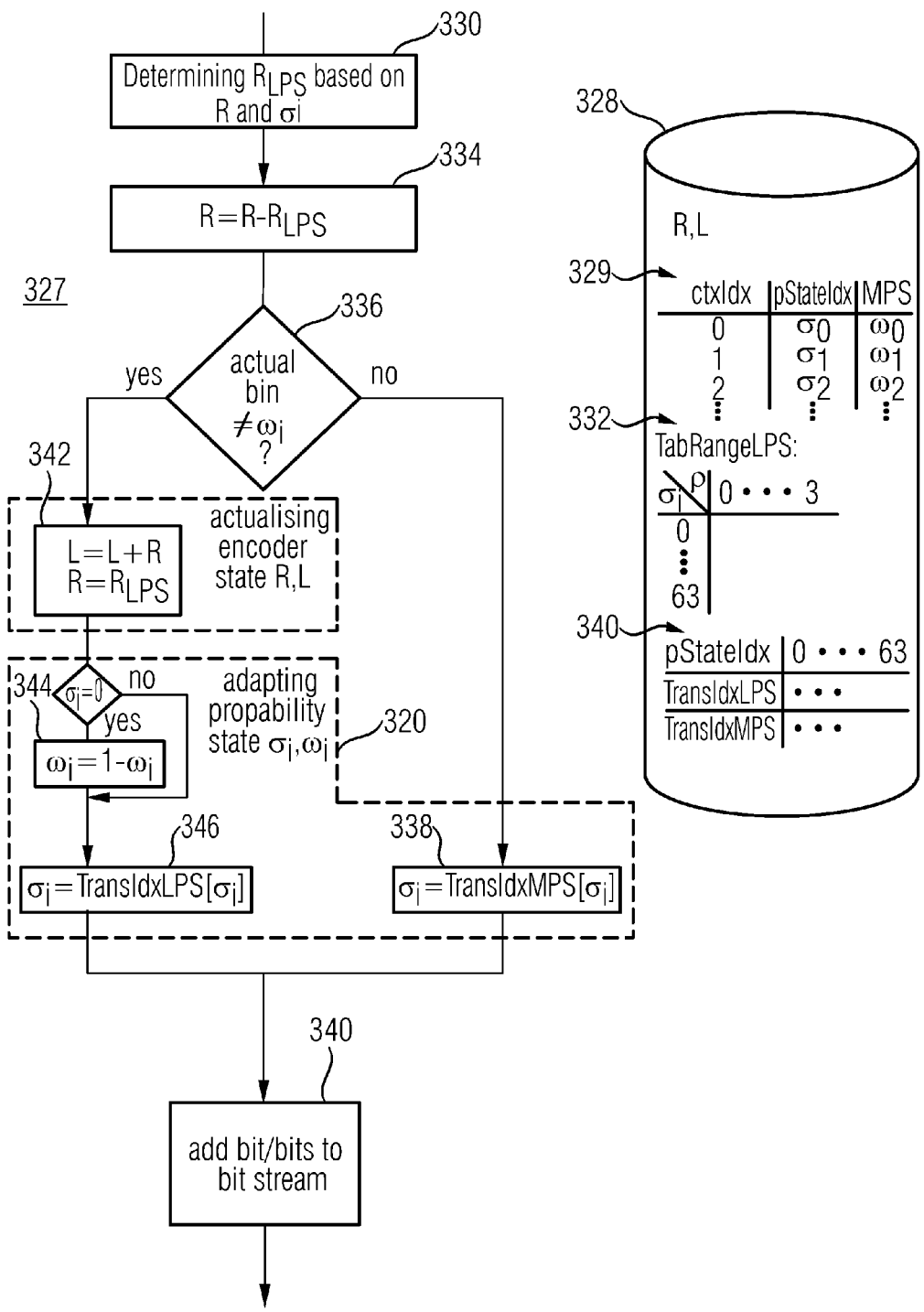
FIG. 6 shows a flow diagram illustrating the binary arithmetic coding of the syntax elements based on the context model to which it is assigned in accordance with an embodiment of the present invention.
Figure 11:
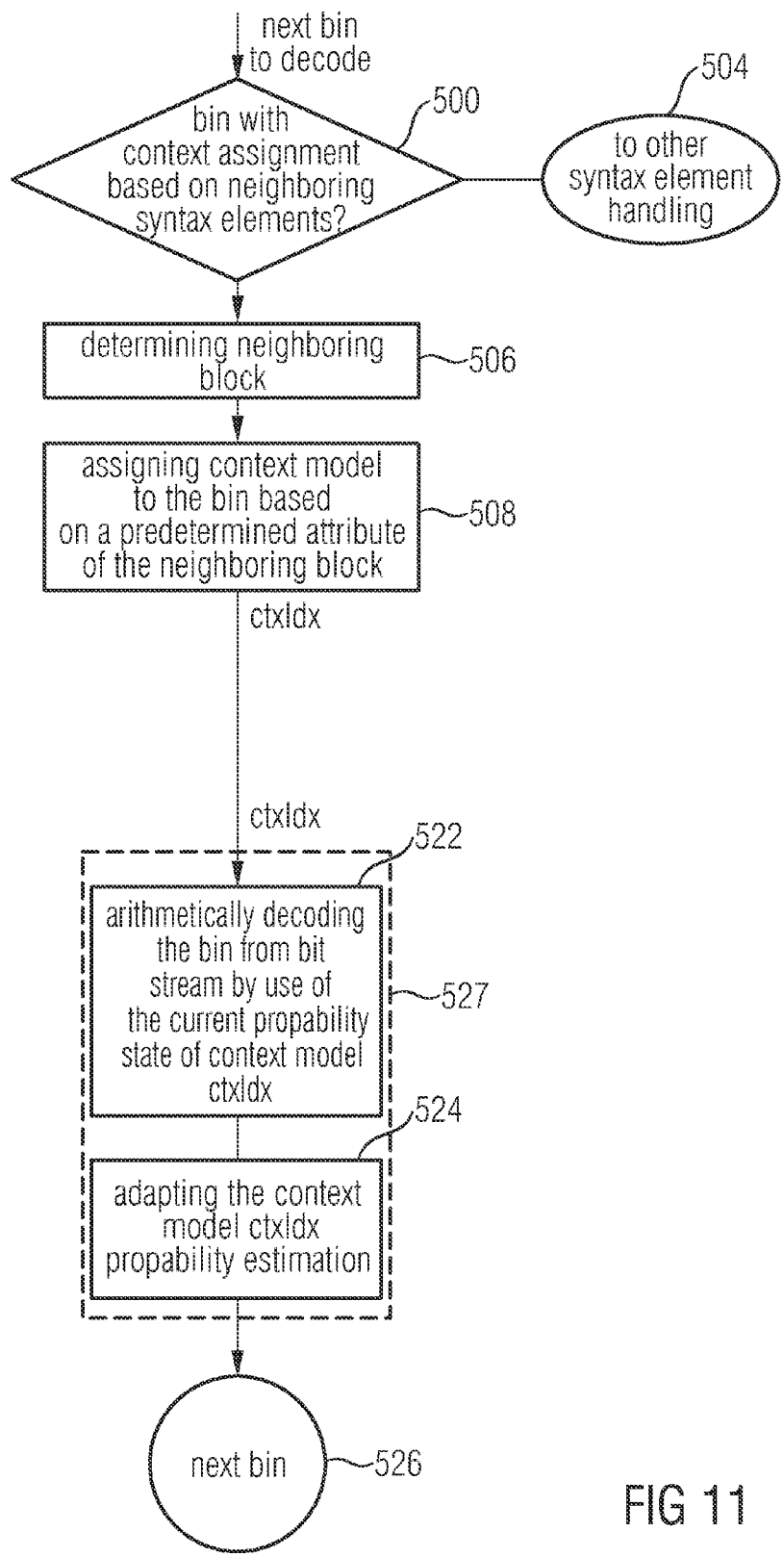

FIG. 11 shows a flow diagram illustrating the decoding of the syntax elements coded as shown in FIGS. 5 and 6 from the coded bit stream, in accordance with an embodiment of the present invention.

Figure 12:
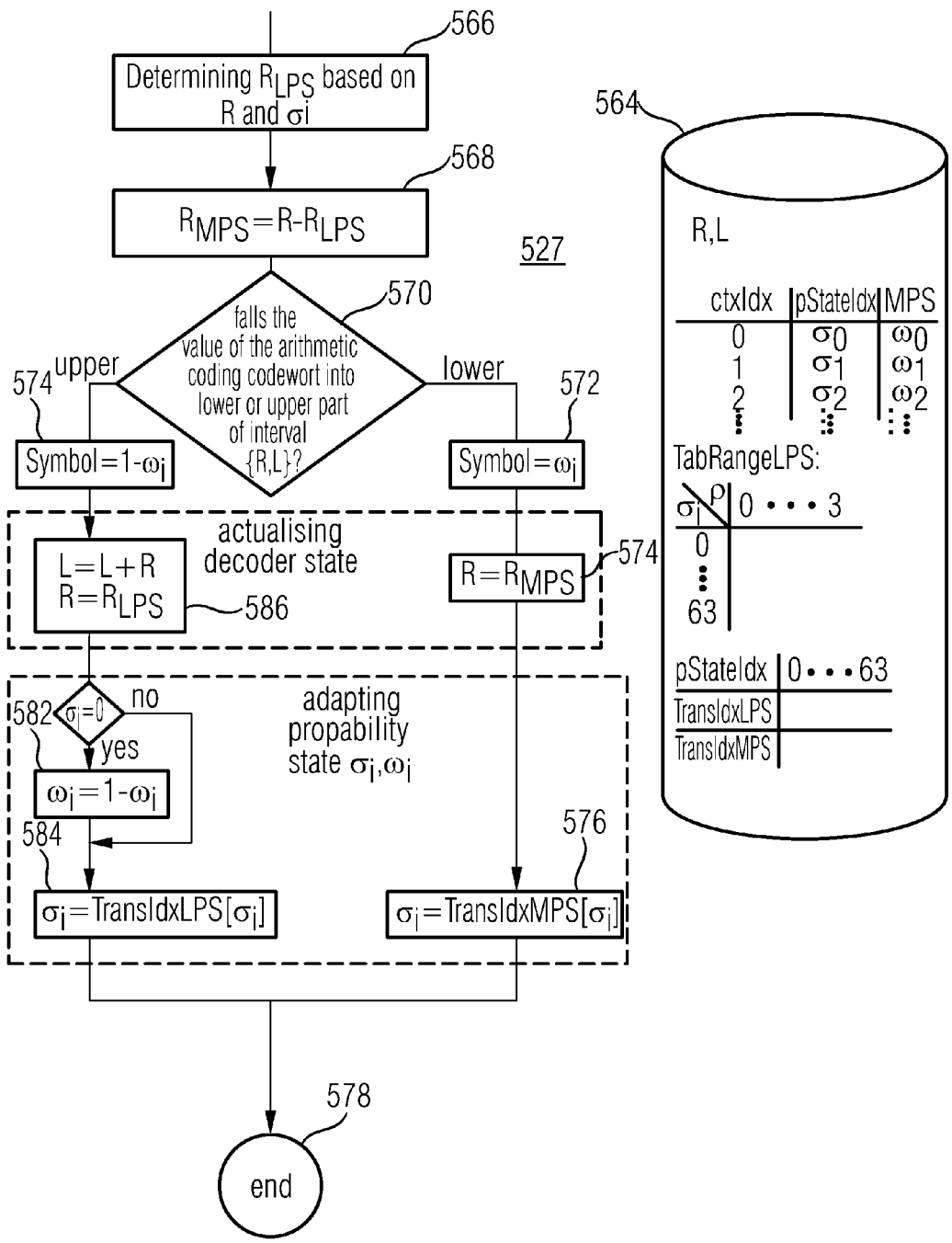

FIG. 12 shows a flow diagram illustrating the arithmetical decoding process and the decoding process of FIG. 11 in accordance with an embodiment of the present invention.

Figure 13:
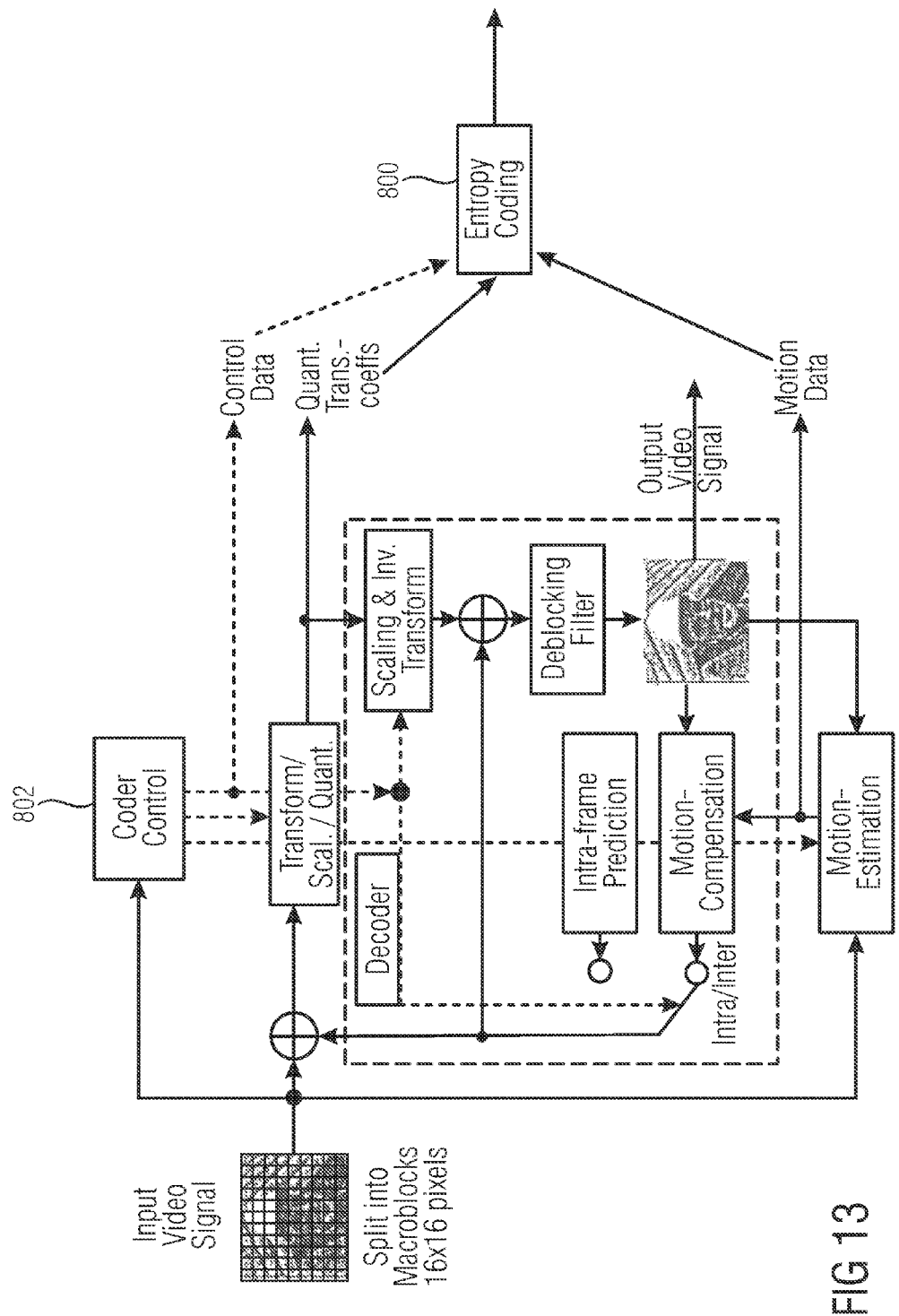

FIG. 13 shows a basic coding structure for the emerging H.264/AVC video encoder for a macroblock.

Figure 14:
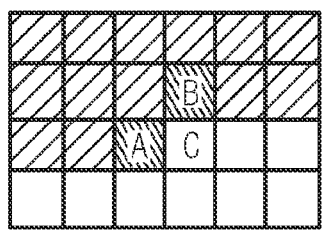

FIG. 14 illustrates a context template consisting of two neighboring syntax elements A and B to the left and on the top of the current syntax element C.

Figure 15:
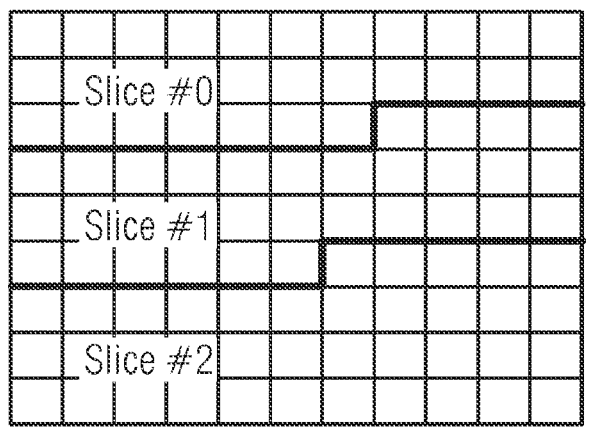

FIG. 15 shows an illustration of the subdivision of a picture into slices.

Figure 16:
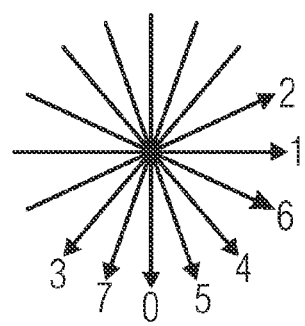

FIG. 16 shows, to the left, intra_4×4 prediction conducted for samples a-p of a block using samples A_Q, and to the right, "prediction directions for intra_4×4 prediction.

Figure 1:
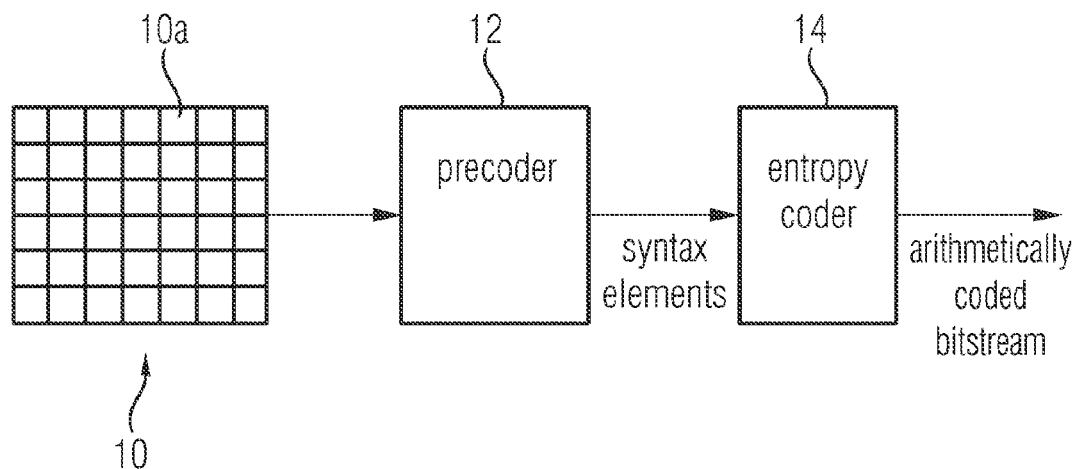
FIG. 1 shows a high-level block diagram of a coding environment in which the present invention may be employed.

FIG. 1 shows a general view of a video encoder environment to which the present invention could be applied. A picture of video frame 10 is fed to a video precoder 12. The video precoder treats the picture 10 in units of so-called macroblocks 10a. Each macroblock contains several picture samples of picture 10. On each macroblock a transformation into transformation coefficients is performed followed by a quantization into transform coefficient levels. Moreover, intra-frame prediction or motion compensation is used in order not to perform the aforementioned steps directly on the pixel data but on the differences of same to predicted pixel values, thereby achieving small values which are more easily compressed.

Precoder 12 outputs the result, i.e., the precoded video signal. All residual data elements in the precoded video signal, which are related to the coding of transform coefficients, such as the transform coefficient levels or a significance map indicating transform coefficient levels skipped, are called residual data syntax elements. Besides these residual data syntax elements, the precoded video signal output by precoder 12 contains control information syntax elements containing control information as to how each macroblock has been coded and has to be decoded, respectively. In other words, the syntax elements are dividable into two categories. The first category, the control information syntax elements, contains the elements related to a macroblock type, sub-macroblock type, and information on prediction modes both of a spatial and of temporal types as well as slice-based and macroblock-based control information, for example. In the second category, all residual data elements such as a significance map indicating the locations of all significant coefficients inside a block of quantized transform coefficients, and the values of the significant coefficients, which are indicated in units of levels corresponding to the quantizations steps, are combined, i.e., the residual data syntax elements.

The macroblocks into which the picture 10 is partitioned are grouped into several slices. In other words, the picture 10 is subdivided into slices. An example for such a subdivision is shown in FIG. 16, in which each block or rectangle represents a macroblock. For each slice, a number of syntax elements are generated by precoder 12, which form a coded version of the macro blocks of the respective slice.

Figure 2:
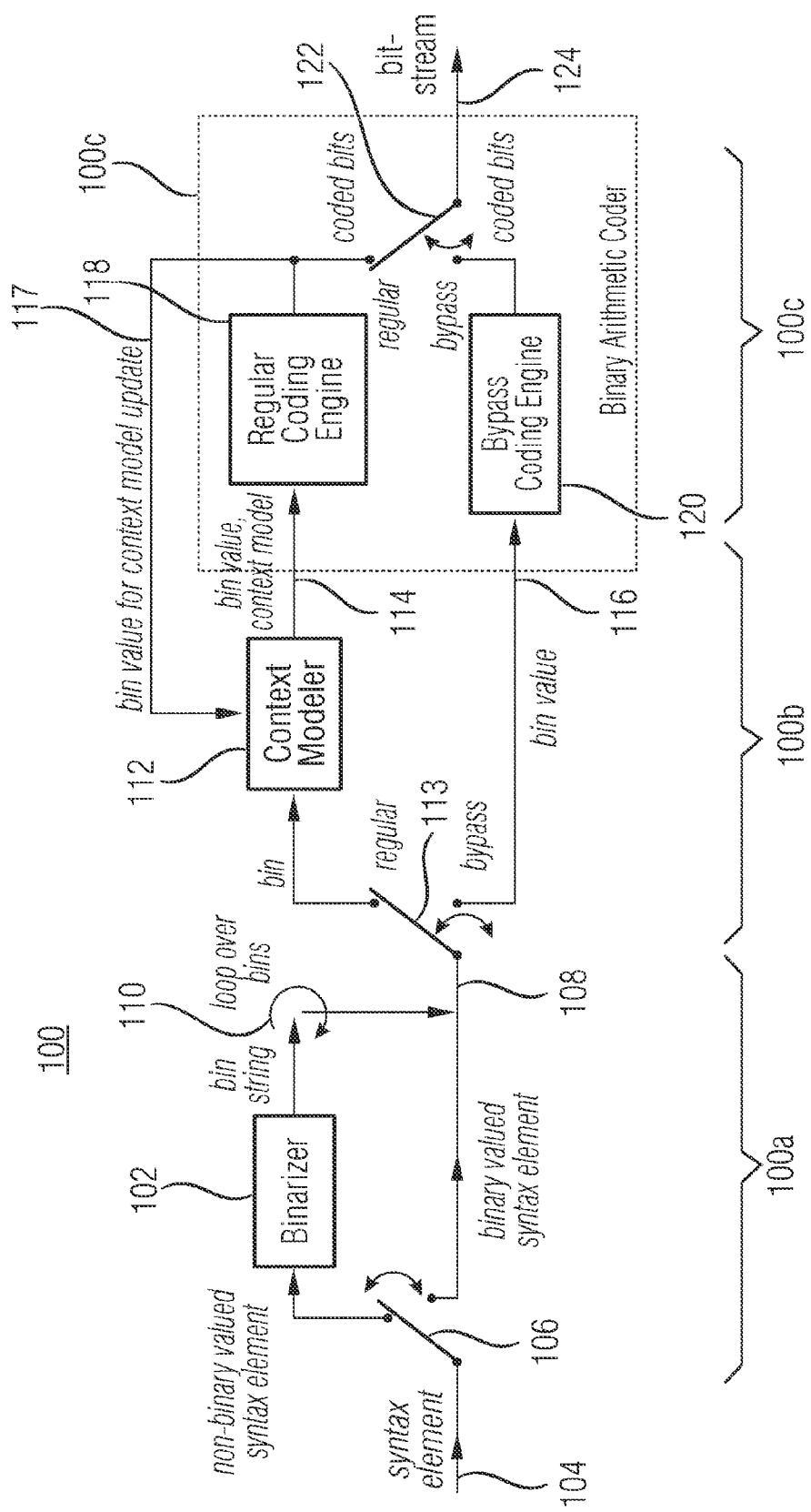
FIG. 2 shows a block diagram of the entropy coding part of the coding environment of FIG. 1, in accordance with an embodiment of the present invention.

The precoder 12 transfers the syntax elements to a final coder stage 14, which is an entropy coder and explained in more detail with respect to FIG. 2. The final coder stage 14 generates an arithmetic codeword for each slice. When generating the arithmetic codeword for a slice, the final coding stage 14 exploits the fact that each syntax element is a data value having a certain meaning in the video signal bit stream that is passed to the entropy coder 14. The entropy coder 14 outputs a final compressed arithmetic code video bit stream comprising arithmetic codewords for the slices of picture 10.

FIG. 2 shows the arrangement for coding the syntax elements into the final arithmetic code bit stream, the arrangement generally indicated by reference number 100. The coding arrangement 100 is divided into three stages, 100a, 100b, and 100c.

The first stage 100a is the binarization stage and comprises a binarizer 102. An input of the binarizer 102 is connected to an input 104 of stage 100a via a switch 106. At the same time, input 104 forms the input of coding arrangement 100. The output of binarizer 102 is connected to an output 108 of stage 100a, which, at the same time, forms the input of stage 100b. Switch 106 is able to pass syntax elements arriving at input 104 to either binarizer 102 or binarization stage output 108, thereby bypassing binarizer 102.

The function of switch 106 is to directly pass the actual syntax element at input 104 to the binarization stage output 108 if the syntax element is already in a wanted binarized form. Examples for syntax elements that are not in the correct binarization form, called non-binary valued syntax elements, are motion vector differences and transform coefficient levels. Examples for a syntax element that has not to be binarized since it is already a binary value comprise the MBAFF (MBAFF=Macroblock Adaptive Frame/Field) Coding mode flag or mb_field_decoding_flag, the rub_skip_flag and coded_block_flag to be described later in more detail. Examples for a syntax element that has to be binarized since it is not a binary value comprise syntax elements mb_type, coded_block_pattern, ref_idx_l0, ref_idx_l1, mvd_l0, mvd_l1, and intro_chroma_pred_mode.

Different binarization schemes are used for the syntax elements to be binarized. For example, a fixed-length binarization process is constructed by using an L-bit unsigned integer bin string of the syntax element value, where L is equal to $\log_2$ (cMax+1) rounded up to the nearest integer greater than or equal to the sum, with cMax being the maximum possible value of the syntax element. The indexing of the bins for the fl binarization is such that the bin index of zero relates to the least significant bit with increasing values of the bin index towards the most significant bit. Another binarization scheme is a truncated unary binarization scheme where syntax element values C smaller than the largest possible value cMax are mapped to a bit or bin string of length C+1 with the bins having a bin index smaller than C being equal to 1 and the bin having the bin index of C being equal to 0, whereas for syntax elements equal to the largest possible value cMax, the corresponding bin string is a bit string of length cMax with all bits equal to one not followed by a zero. Another binarization scheme is a k-th order exponential Golomb binarization scheme, where a syntax element is mapped to a bin string consisting of a prefix bit string and, eventually, a suffix bit string.

The non-binary valued syntax elements are passed via switch 106 to binarizer 102. Binarizer 102 maps the non-binary valued syntax elements to a codeword, or a so-called bin string, so that they are now in a binary form. The term "bin" means the binary decision that have to be made at a node of a coding tree defining the binarization mapping of a non-binary value to a bit string or codeword, when transitioning from the route node of the coding tree to the leaf of the coding tree corresponding to the non-binary value of the non-binary syntax element to be binarized. Thus, a bin string is a sequence of bins or binary decisions and corresponds to a codeword having the same number of bits, each bit being the result of a binary decision.

The bin strings output by binarizer 102 may not be passed directly to binarization stage output 108 but controllably passed to output 108 by a bin loop over means 110 arranged between the output of binarizer 102 and output 108 in order to merge the bin strings output by binarizer 102 and the already binary valued syntax elements bypassing binarizer 102 to a single bit stream at binarization stage output 108.

Thus, the binarization stage 108 is for transferring the syntax elements into a suitable binarized representation. The binarization procedure in binarizer 102 preferably yields a binarized representation which is adapted to the probability distribution of the syntax elements so as to enable very efficient binary arithmetic coding.

Stage 100b is a context modeling stage and comprises a context modeler 112 as well as a switch 113. The context modeler 112 comprises an input, an output, and an optional feedback input. The input of context modeler 112 is connected to the binarization stage output 108 via switch 113. The output of context modeler 112 is connected to a regular coding input terminal 114 of stage 100c. The function of switch 113 is to pass the bits or bins of the bin sequence at binarization stage output 108 to either the context modeler 112 or to a bypass coding input terminal 116 of stage 100c, thereby bypassing context modeler 112.

The aim of switch 113 is to ease the subsequent binary arithmetic coding performed in stage 100c. To be more precise, some of the bins in the bin string output by binarizer 102 show heuristically nearly an equi-probable distribution. This means, the corresponding bits are, with a probability of nearly 50%, 1 and, with a probability of nearly 50%, 0, or, in other words, the bits corresponding to this bin in a bin string have a 50/50 chance to be 1 or 0. These bins are fed to the bypass-coding input terminal 116 and are binary arithmetically coded by use of an equi-probable probability estimation, which is constant and, therefore, needs no adaption or updating overhead. For all other bins, it has been heuristically determined that the probability distribution of these bins depends on other bins as output by stage 100a so that it is worthwhile to adapt or update the probability estimation used for binary arithmetically coding of the respective bin as it will be described in more detail below exemplarily with respect to exemplary syntax elements. The latter bins are thus fed by switch 113 to the input terminal of context modeler 112.

Context modeler 112 manages a set of context models. For each context model, the context modeler 112 has stored an actual bit or bin value probability distribution estimation. For each bin that arrives at the input of context modeler 112, the context modeler 112 selects one of the sets of context models. In other words, the context modeler 112 assigns the bin to one of the set of context models. The assignment of bins to a context model is such that the actual probability distribution of bins belonging to the same context model show the same or likewise behavior so that the actual bit or bin value probability distribution estimation stored in the context modeler 112 for a certain context model is a good approximation of the actual probability distribution for all bins that are assigned to this context model. The assignment process in accordance with the present invention exploits the spatial relationship between syntax element of neighboring blocks. This assignment process will be described in more detail below.

When having assigned the context model to an incoming bin the context modeler 112 passes the bin further to arithmetical coding stage 100c together with the probability distribution estimation of the context model, which the bin is assigned to. By this measure, the context modeler 112 drives the arithmetical coding stage 100c to generate a sequence of bits as a coded representation of the bins input in context modeler 112 by switch 113 according to the switched bit value probability distribution estimations as indicated by the context modeler 112.

Moreover, the context modeler 112 continuously updates the probability distribution estimations for each context model in order to adapt the probability distribution estimation for each context model to the property or attributes of the picture or video frame from which the syntax elements and bins have been derived. The estimation adaptation or estimation update is based on past or prior bits or bin values which the context modeler 112 receives at the feedback input over a feedback line 117 from stage 100c or may temporarily store. Thus, in other words, the context modeler 112 updates the probability estimations in response to the bin values passed to arithmetical coding stage 100c. To be more precise, the context modeler 112 uses a bin value assigned to a certain context model merely for adaptation or update of the probability estimation that is associated with the context model of this bin value.

Some of the syntax elements, when the same bin or same syntax element occurs several times in the bins passed from stage 100a may be assigned to different of the context models each time they occur, depending on previously incoming or previously arithmetically coded bins, and/or depending on other circumstances, such as previously coded syntax elements of neighboring blocks, as is described in more detail below with respect to exemplary syntax elements.

It is clear from the above, that the probability estimation used for binary arithmetically coding determines the code and its efficiency in the first place, and that it is of paramount importance to have an adequate model that exploits the statistical dependencies of the syntax elements and bins to a large degree so that the probability estimation is always approximating very effectively the actual probability distribution during encoding.

The third stage 100c of coding arrangement 100 is the arithmetic coding stage. It comprises a regular coding engine 118, a bypass-coding engine 120, and a switch 122. The regular coding engine 118 comprises an input and an output terminal. The input terminal of regular coding engine 118 is connected to the regular coding input terminal 114. The regular coding engine 118 binary arithmetically codes the bin values passed from context modeler 112 by use of the context model also passed from context modeler 112 and outputs coded bits. Further, the regular coding engine 118 passes bin values for context model updates to the feedback input of context modeler 112 over feedback line 117.

The bypass-coding engine 112 has also an input and an output terminal, the input terminal being connected to the bypass coding input terminal 116. The bypass-coding engine 120 is for binary arithmetically coding the bin values passed directly from binarization stage output 108 via switch 113 by use of a static predetermined probability distribution estimation and also outputs coded bits.

The coded bits output from regular coding engine 118 and bypass coding engine 120 are merged to a single bit stream at an output 124 of coding arrangement 100 by switch 122, the bit stream representing a binary arithmetic coded bit stream of the syntax elements as input in input terminal 104. Thus, regular coding engine 118 and bypass coding 120 cooperate in order to bit wise perform arithmetical coding based on either an adaptive or a static probability distribution model.

After having described with respect to FIGS. 1 and 2 rather generally the operation of coding arrangement 100, in the following its functioning is described in more detail with respect to the handling of exemplary syntax elements for which an context assignment process based on syntax elements of neighboring blocks is used, in accordance with embodiments of the present invention. In order to do so, firstly, with regard to FIGS. 3 to 4b, the meaning of MBAFF coding is described, in order to enable a better understanding of the definition of neighborhood between a current block and a neighboring block used during assignment of a context model to a syntax element concerning the current block in case of MBAFF.

Figures 3, 4A:
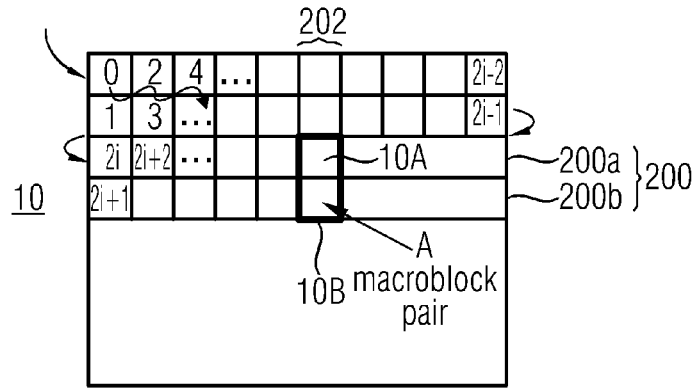
FIG. 3 shows a schematic diagram illustrating the spatial subdivision of a picture or video frame into macroblock pairs, in accordance with an embodiment of the present invention.
FIG. 4a shows a schematic diagram illustrating the frame mode, in accordance with an embodiment of the present invention.

FIG. 3 shows a picture or decoded video frame 10. The video frame 10 is spatially partitioned into macroblock pairs 10b. The macroblock pairs are arranged in an array of rows 200 and columns 202. Each macroblock pair consists of two macroblocks 10a.

In order to be able to address each macroblock 10a, a sequence is defined with respect to macroblocks 10a. In order to do so, in each macroblock pair, one macroblock is designated the top macroblock whereas the other macroblock in the macroblock pair is designated the bottom macroblock, the meaning of top and bottom macroblock depending on the mode by which a macroblock pair is coded by precoder 12 (FIG. 1) as will be described with respect to FIGS. 4a and 4b. Thus, each macroblock pair row 200 consists of two macroblock rows, i.e., an top macroblock row 200a consisting of the top macroblocks in the macroblock pairs of the macroblock pair line 200 and a bottom macroblock row 200b comprising the bottom macroblocks of the macroblock pairs.

In accordance with the present example, the top macroblock of the top left macroblock pair resides at address zero. The next address, i.e. address 1, is assigned to the bottom macroblock of the top left macroblock pair. The addresses of the top macroblocks of the macroblock pairs in the same, i.e., top macroblock row 200a, are 2, 4, . . . , 2$i$-2, with the addresses rising from left to right, and with i expressing the picture width in units of macroblocks or macroblock pairs. The addresses 1, 3, 2$i$-1 are assigned to the bottom macroblocks of the macroblock pairs in the top macroblock pair row 200, the addresses rising from left to right. The next 2$i$-addresses from 2$i$ to 4$i$-1 are assigned to the macroblocks of the macroblock pairs in the next macroblock pair row from the top and so on, as illustrated in FIG. 3 by the numbers written into the boxes representing the macroblocks 10a and by the arched rows.

It is emphasized that FIG. 3 does show the spatial subdivision of picture 10 in units of macroblock pairs rather than in macroblocks. Each macroblock pair 10b represents a spatial rectangular region of the pictures. All picture samples or pixels (not shown) of picture 10 lying in the spatial rectangular region of a specific macroblock pair 10b belong to this macroblock pair. If a specific pixel or picture sample belongs to the top or the bottom macroblock of a macroblock pair depends on the mode by which precoder 12 has coded the macroblocks in that macroblock pair as it is described in more detail below.

FIG. 4a shows on the left hand side the arrangement of pixels or picture samples belonging to a macroblock pair 10b. As can be seen, the pixels are arranged in an array of rows and columns. Each pixel shown is indicated by a number in order to ease the following description of FIG. 4a. As can be seen in FIG. 4a, some of the pixels are marked by an "x" while the others are marked "□". All pixels marked with "x" belong to a first field of the picture while the other pixels marked with "□" belong to a second field of the picture. Pixels belonging to the same field are arranged in alternate rows of the picture.

The picture or video frame can be considered to contain two interleaved fields, a top and a bottom field. The top field comprises the pixels marked with "☐" and contains even-numbered rows $2n+2$, $2n+4$, $2n+6$, ... with $2n$ being the number of rows of one picture or video frame and n being an integer greater than or equal to 0. The bottom field contains the odd-numbered rows starting with the second line of the frame.

It is assumed that the video frame to which macroblock pair 10b belongs, is an interlaced frame where the two fields were captured at different time instants, for example the top field before the bottom field. It is now that the pixels or picture samples of a macroblock pair are differently assigned to the top or bottom macroblock of the macroblock pair, depending on the mode by which the respective macroblock pair is precoded by precoder 12 (FIG. 1). The reason for this being the following.

As described above with respect to FIG. 1, the picture samples of a macroblock, which may be luminance or luma and chrominance or chroma samples, may be either spatially or temporarily predicted by precoder 12, and the resulting prediction residual is encoded using transform coding in order to yield the residual data syntax elements. It is now that in interlaced frames (and it is assumed that the present video frame is an interlaced frame), with regions of moving objects or camera motion, two adjacent rows of pixels tend to show a reduced degree of statistical dependency when compared to progressive video frames in which both fields are captured at the same time instant. Thus, in cases of such moving objects or camera motion, the pre-coding performed by precoder 12 which, as stated above, operates on macroblocks, may achieve merely a reduced compression efficiency when a macroblock pair is spatially sub-divided into a top macroblock representing the top half region of the macroblock pair and a bottom macroblock representing the bottom half region of the macroblock pair, since in this case, both macroblocks, the top and the bottom macroblock, comprise both top field and bottom field pixels. In this case, it may be more efficient for precoder 12 to code each field separately, i.e., to assign top field pixels to the top macroblock and bottom field pixels to the bottom field macroblock.

Figures 4B, 7:
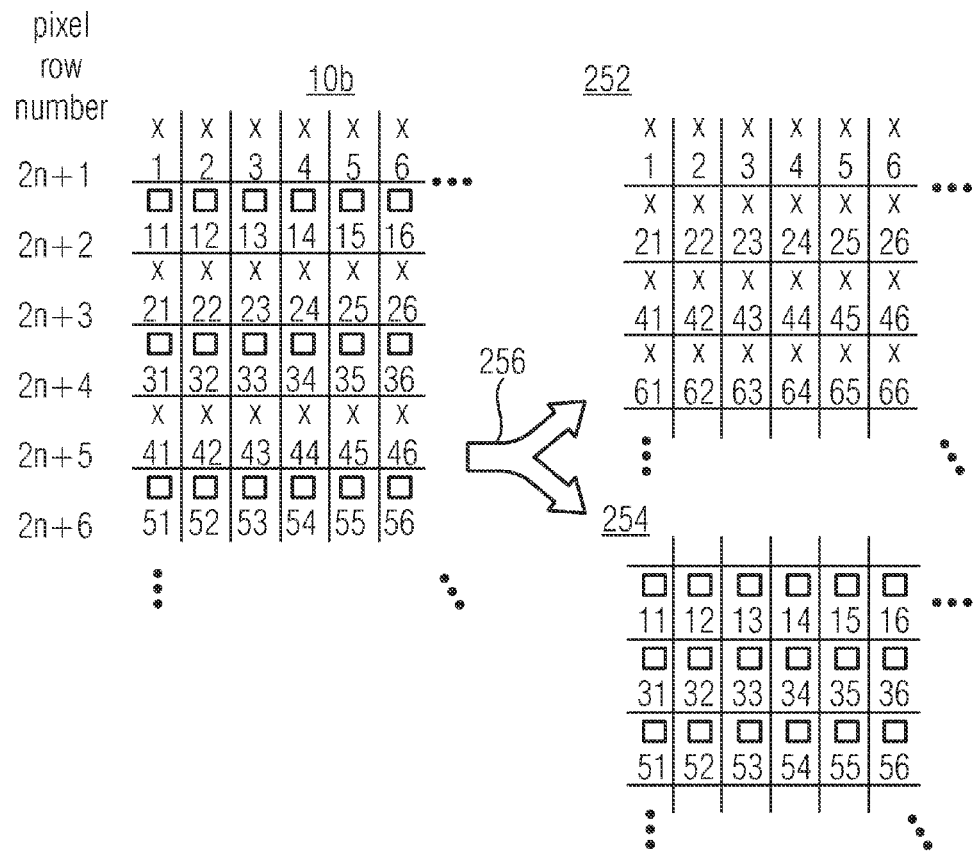
FIG. 4b shows a schematic diagram illustrating the field mode, in accordance with an embodiment of the present invention.
FIG. 7 shows a schematic diagram illustrating the addressing scheme of the macroblocks in accordance with an embodiment of the present invention.

In order to illustrate as to how the pixels of a macroblock pair are assigned to the top and bottom macroblock of the, FIGS. 4a and 4b show on the right hand side the resulting top and bottom macroblock in accordance with the frame and field mode, respectively.

FIG. 4a represents the frame mode, i.e., where each macroblock pair is spatially subdivided in a top and a bottom half macroblock. FIG. 4a shows at 250 the top macroblock and at 252 the bottom macroblock as defined when they are coded in the frame mode, the frame mode being represented by double-headed arrow 254. As can be seen, the top macroblock 250 comprises one half of the pixel samples of the macroblock pair 10b while the other picture samples are assigned to the bottom macroblock 252. To be more specific, the picture samples of the top half rows numbered $2n+1$ to $2n+6$ belong to the top macroblock 250, whereas the picture samples 91 to 96, 101 to 106, 111 to 116 of the bottom half comprising rows $2n+7$ to $2n+12$ of the macroblock pair 10b belong to the bottom macroblock 252. Thus, when coded in frame mode, both macroblocks 250 and 252 comprise both, picture elements of the first field marked with "x" and captured at a first time instant and picture samples of the second field marked with "☐" and captured at a second, different time instant.

The assignment of pixels as they are output by a camera or the like, to top or bottom macroblocks is slightly different infield mode. When coded in field mode, as is indicated by double headed arrow 256 in FIG. 4b, the top macroblock 252 of the macroblock pair 10b contains all picture samples of the top field, marked with "x", while the bottom macroblock 254 comprises all picture samples of the bottom field, marked with "☐". Thus, when coded in accordance with field mode 256, each macroblock in a macroblock pair does merely contain either picture samples of the top field or picture samples of the bottom field rather than a mix of picture samples of the top and bottom field.

Now, after having described the spatial sub-division of a picture into macroblock pairs and the assignment of picture samples in a macroblock pair to either the top or the bottom macroblock of the macroblock pair, the assignment depending on the mode by which the macroblock pair or the macroblocks of the macroblock pair are coded by precoder 12, reference is again made to FIG. 1 in order to explain the function and meaning of the syntax element mb_field_decoding_flag contained in the precoded video signal output by precoder 12, and, concurrently, in order to explain the advantages of MBAFF coded frames over just field or frame coded frames.

When the precoder 12 receives a video signal representing an interlaced video frame, precoder 12 is free to make the following decisions when coding the video frame 10:

1. It can combine the two fields together to code them as one single coded frame, so that each macroblock pair and each macroblock would be coded in frame mode.
2. Alternatively, it could combine the two fields and code them as separate coded fields, so that each macroblock pair and each macroblock would be coded in field mode.
3. As a last option, it could combine the two fields together and compress them as a single frame, but when coding the frame it splits the macroblock pairs into either pairs of two field macroblocks or pairs of two frame macroblocks before coding them.

The choice between the three options can be made adaptively for each frame in a sequence. The choice between the first two options is referred to as picture adaptive frame/field (PAFF) coding. When a frame is coded as two fields, each field is partitioned into macroblocks and is coded in a manner very similar to a frame.

If a frame consists of mixed regions where some regions are moving and others are not, it is typically more efficient to code the non-moving regions in frame mode and the moving regions in the field mode. Therefore, the frames/field encoding decision can be made independently for each vertical pair of macroblocks in a frame. This is the third coding option of the above-listed options. This coding option is referred to as macroblock adaptive frame/field (MBAFF) coding. It is assumed in the following that precoder 12 decides to use just this option. As described above, MBAFF coding allows the precoder to better adapt the coding mode type (filed or frame mode) to the respective areas of scenes. For example, precoder 12 codes macroblock pairs located at stationary areas of a video scene in frame mode, while coding macroblock pairs lying in areas of a scene showing fast movements in field mode.

As mentioned above, for a macroblock pair that is coded in frame mode, each macroblock contains frame lines. For a macroblock pair that is coded in field mode, the top macroblock contains top field lines and the bottom macroblock contains bottom field lines. The frame/field decision for each macroblock pair is made at the macroblock pair level by precoder 12, i.e. if the top macroblock is field coded same applies for the bottom macroblock within same macroblock pair. By this measure, the basic macroblock processing structure is kept intact, and motion compensation areas are permitted to be as large as the size of a macroblock.

Each macroblock of a field macroblock pair is processed very similarly to a macroblock within a field in PAFF coding. However, since a mixture of field and frame macroblock pairs may occur within an MBAFF frame, some stages of the pre-coding procedure in precoder 12, such as the prediction of motion vectors, the prediction of intra prediction modes, intra frame sample prediction, deblocking filtering and context modeling in entropy coding and the zig-zag scanning of transform coefficients are modified when compared to the PAFF coding in order to account for this mixture.

To summarize, the pre-coded video signal output by precoder 12 depends on the type of coding precoder 12 has decided to use. In case of MBAFF coding, as it is assumed herein, the pre-coded video signal contains a flag mb_field_decoding_flag for each non-skipped macroblock pair. The flag mb_field_decoding_flag indicates for each macroblock pair it belongs to whether the corresponding macroblocks are coded in frame or field coding mode. On decoder side, this flag is necessary in order to correctly decode the precoded video signal. In case, the macroblocks of a macroblock pair are coded in frame mode, the flag mb_field_decoding_flag is zero, whereas the flag is one in the other case.

Now, while the general mode of operation of the original decoder arrangement of FIG. 2 has been described without referring to a special bin, with respect to FIG. 5, the functionality of this arrangement is now described with respect to the binary arithmetic coding of the bin strings of exemplary syntax elements for which the spatial relationship between the syntax element of neighboring blocks is used while MBAFF coding mode is active.

The process shown in FIG. 5 starts at the arrival of a bin value of a syntax element at the input of context modeler 112. That is, eventually, the syntax element had to be binarized in binarizer 102 if needed, i.e. unless the syntax element is already a binary value. In a first step 300, context modeler 112 determines as to whether the incoming bin is a bin dedicated to a context assignment based on neighboring syntax elements, i.e. syntax elements in neighboring blocks. It is recalled that the description of FIG. 5 assumes that MBAFF coding is active. If the determination in step 300 results in the incoming bin not being dedicated to context assignment based on neighboring syntax elements, another syntax element handling is performed in step 304. In the second case, context modeler 112 determines a neighboring block of the current block to which the syntax element of the incoming bin relates. The determination process of step 306 is described in more detail below with respect to exemplary syntax elements and their bins, respectively. In any case, the determination in step 306 depends on the current macroblock to which the syntax element of the current bin relates being frame or field coded, as long as the neighboring block in question is external to the macroblock containing the current block.

Next, in step 308, the context modeler 112 assigns a context model to the bin based on a predetermined attribute of the neighboring block. The step of assigning 308 results in a context index ctxIdx pointing to the respective entry in a table assigning each context index a probability model, to be used for binary arithmetic coding of the current bin of the current syntax element.

After the determination of ctxIdx, context modeler 112 passes the variable ctxIdx or the probability estimation status indexed by ctxIdx along with the current bin itself to regular coding engine 118. Based on these inputs, the regular coding engine 118 arithmetically encodes, in step 322, the bin into the bit stream 124 by using the current probability state of the context model as indexed by ctxIdx.

Thereafter, regular coding engine 118 passes the bin value via path 117 back to context modeler 112, whereupon context modeler 112 adapts, in step 324, the context model indexed by ctxIdx with respect to its probability estimation state. Thereafter, the process of coding the syntax element into the bit stream at the output 124 ends at 326.

It is emphasized that the bin string into which the syntax element may be binarized before step 310 may be composed of both, bins that are arithmetically encoded by use of the current probability state of context model ctxIdx in step 322 and bins arithmetically encoded in bypass coding engine 120 by use of an equi-probable probability estimation although this is not shown in FIG. 5. Rather, FIG. 5 merely concerns the exemplary encoding of one bin of a syntax element.

The steps 322 and 324, encompassed by dotted line 327 in FIG. 5, are explained in more detail below with respect to FIG. 6.

FIG. 6 shows, on the left hand side, a flow diagram of the process 327. On the right hand side, FIG. 6 shows a memory 328 to which both, the context modeler 112 and the regular coding engine 118, have access in order to load, write, and update specific variables. These variables comprise R and L, which define the current state or current probability interval of the binary arithmetical coder 100c. In particular, R denotes the current interval range R, while L denotes the base or lower end point of current probability interval. Thus, the current interval of the binary arithmetic coder 100c extends from L to L+R.

Furthermore, memory 328 contains a table 329, which associates each possible value of ctxIdx, e.g. 0-398, a pair of a probability state index $\sigma$ and an MPS value $\omega$, both defining the current probability estimation state of the respective context model indexed by the respective context index ctxIdx. The probability state $\sigma$ is an index that uniquely identifies one of a set of possible probability values $p_\sigma$. The probability values $p_\sigma$ are an estimation for the probability of the next bin of that context model to be a least probable symbol (LPS). Which of the possible bin values, i.e., a null or one, is meant by the LPS, is indicated by the value of MPS $\omega$. If $\omega$ is 1, LPS is 0 and vice-versa. Thus, the state index and MPS together uniquely define the actual probability state or probability estimation of the respective context model. Both variables divide the actual interval L to L+R into two sub-intervals, namely the first sub-interval extending from L to $L+R\cdot(1-p_\sigma)$ and the second interval extending from $L+R\cdot p_\sigma$ to L+R. The first or lower sub-interval corresponds to the most probable symbol whereas the upper sub-interval corresponds to the least probable symbol. Exemplary values for $p_\sigma$ are derivable from the following recursive equation, with a being $\alpha$ value between about 0.8 to 0.99, and preferably being $\alpha=(0.01875/0.5)^{1/63}$, $\sigma$ being an integer from 1 to 63: $p_\sigma=\alpha\cdot p_{\sigma-1}$, for all $\sigma=1,\ldots,63$, and $p_0=0.5$.

Now, in a first step 330, the range $R_{LPS}$ of the lower sub-interval is determined based on R and the probability state corresponding to the chosen context model indexed by ctxIdx, later on called simply $\sigma_i$, with i being equal to ctxIdx. The determination in step 330 may comprise a multiplication of R with $p_{\sigma_i}$. Nevertheless, in accordance with an alternative embodiment, the determination in step 330 could be conducted by use of a table, which assigns to each possible pair of probability state index $\sigma_i$ and a variable $\rho$ a value for $R_{LPS}$, such a table being shown at 332. The variable $\rho$ would be a measure for the value of R in some coarser units then a current resolution by which R is computationally represented.

After having determined $R_{LPS}$, in step 334, regular coding engine 118 amends R to be $R-R_{LPS}$, i.e., to be the range of the lower sub-interval.

Thereafter, in step 336, the regular coding engine 118 checks as to whether the value of the actual bin, i.e. either the already binary syntax element or one bin of a bin string obtained from the current syntax element, is equal to the most probable symbol as indicated by $\omega_i$ or not. If the current bin is the MPS, L needs not to be updated and the process transitions to step 338, where context modeler 112 updates the probability estimation state of the current context model by updating $\sigma_i$. In particular, context modeler 112 uses a table 340 which associates each probability state index $\sigma$ with an updated probability state index in case the actual symbol or bin was the most probable symbol, i.e., $\sigma$ becomes transIdxMPS ($\sigma_i$).

After step 338, the process ends at 340 where bits or a bit are added to the bit stream if possible. To be more specific, a bit or bits are added to the bit stream in order to indicate a probability value falling into the current interval as defined by R and L. In particular, step 340 is performed such that at the end of a portion of the arithmetic coding of a precoded video signal, such as the end of a slice, the bit stream defines a codeword defining a value that falls into the interval [L,L+R), thereby uniquely identifying to the decoder the bin values having been encoded into the codeword. Preferably, the codeword defines the value within the current interval having the shortest bit length. As to whether a bit or bits are added to the bit stream in step 340 or not, depends on the fact as to whether the value indicated by the bit stream will remain constant even if the actual interval is further sub-divided with respect to subsequent bins, i.e. as to whether the respective bit of the representation of the value falling in the current interval does not change whatever subdivisions will come. Furthermore, renormalization is performed in step 340, in order to keep R and L represent the current interval within a predetermined range of values.

If in step 336 it is determined that the current bin is the least probable symbol LPS, the regular coding engine 118 actualizes the current encoder state R and L in step 342 by amending L to be L+R and R to be $R_{LPS}$. Then, if a, is equal to 0, i.e. if the probability state index indicates equal probability for both, 1 and 0, in step 344, the value MPS is updated by computing $\omega_i=1-\omega_i$. Thereafter, in step 346, the probability state index is actualized by use of table 340, which also associates each current probability state index with an updated probability state index in case the actual bin value is the least probable symbol, i.e., amending $\sigma_i$ to become transIdxLPS ($\sigma_i$). After the probability state index $\sigma_i$ and $\omega_i$ has been adapted in steps 344 and 346, the process steps to step 340 which has already been described.

After having described the encoding process of syntax elements by exploiting the spatial relationship between syntax element of neighboring blocks for context model assignment, the context model assignment and the definition of the neighborhood between a current and a neighboring block is described in more detail below with respect to the following syntax elements contained in the precoded video signal as output by precoder 12. These syntax elements are listed below.

| Name of the syntax element | Meaning of the syntax element |
|---|---|
| Mb_skip_flag | This flag relates to a certain macroblock of a certain slice of a video frame. Mb_skip_flag equal to 1 specifies that the current macroblock is to be skipped when performing a decoding process on the precoded video signal. Mb_skip_flag equal to 0 specifies that the current macroblock is not skipped. In particular, in the H.264/AVC standard, Mb_skip_flag equal to 1 specifies that for the current macroblock, when decoding a P or SP slice, Mb_type is inferred to be p_skip and the macroblock type is collectively referred to as P macroblock type, and when decoding a B slice, Mb_type is inferred to be B_skip and the macroblock type is collectively referred to as B macroblock type. |
| Mb_field_decoding_flag | Mb_field_decoding_flag equal to 0 specifies that the current macroblock pair is a frame macroblock pair and Mb_field_decoding_flag equal to 0 specifies that the macroblock pair is a field macroblock pair. Both macroblocks of a frame macroblock pair are referred to in the present description as frame macroblocks, whereas both macroblocks of a field macroblock pair are referred to in this text as field macroblocks. |
| Mb_type | Mb_type specifies the macroblock type. For example, the semantics of Mb_type in the H.264/AVC standard depends on the slice type. Depending on the slice type, Mb_type can assume values in the range of 0 to 25, 0 to 30, 0 to 48 or 0-26, depending on the slice type. |
| Coded_block_pattern | Coded_block_pattern specifies which of a sub-part of the current macroblock contains non-zero transform coefficients. Transform coefficients are the scalar quantities, considered to be in a frequency domain, that are associated with a particular one-dimensional or two-dimensional frequency index in an inverse transform part of the decoding process. To be more specific, each macroblock 10a - irrespective of the macroblock being a frame coded macroblock (FIG. 4a) or a field coded macroblock (FIG. 4b), is partitioned into smaller sub-parts, the sub-parts being arrays of size 8 × 8 pixel samples. Briefly referring to FIG. 4a, the pixels 1 to 8, 11 to 18, 21 to 28, . . . , 71 to 78 could form the upper left block of luma pixel samples in the top macroblock 250 of macroblock pair 10b. This top macroblock 250 would comprise another three of such blocks, all four blocks arranged in a 2 × 2 array. The same applies for the bottom macroblock 252 and also applies for field coded macroblocks as shown in FIG. 4b, where, for example, pixels 1 to 8, 21 to 28, 41 to 48, . . . , 141 to 148 would form the upper left block of the top macroblock. Thus, for each macroblock coded, the precoded video signal output by precoder 12 would comprise one or several syntax elements coded_block_pattern. The transformation from spatial domain to frequency domain, could be performed on these 8 × 8 sub-parts or on some smaller units, for example, 4 × 4 sub-arrays, wherein each 8 × 8 sub-part comprises 4 smaller 4 × 4 partitions. The present description mainly concerns luma pixel samples. Nevertheless, the same could also apply accordingly for chroma pixel samples. |
| ref_Idx_l0/ ref_Idx_l1 | This syntax element concerns the prediction of the pixel samples of a macroblock during encoding and decoding. In particular, ref_Idx_l0, when present in the precoded video signal output by precoder 12, specifies an index in a list 0 of a reference picture to be used for prediction. The same applies for ref_Idx_l1 but with respect to another list of the reference picture. |
| mvd_l0/mvd_l1 | mvd_l0 specifies the difference between a vector component to be used for motion prediction and the prediction of the vector component. The same |

-continued

| Name of the syntax element | Meaning of the syntax element |
|---|---|
| | applies for mvd_l1, the only difference being, that same are applied to different reference picture lists. ref_Idx_l0, ref_Idx_l1, mvd_l0 and mvd_l1 all relate to a particular macroblock partition. The partitioning of the macroblock is specified by Mb_type. |
| intra_chroma_pred_mode | Intra_chroma_pred_mode specifies the type of spatial prediction used for chroma whenever any part of the luma macroblock is intra-coded. In intra prediction, a prediction is derived from the decoded samples of the same decoded picture or frame. Intra prediction is contrary to inter prediction where a prediction is derived from decoded samples of reference pictures other than the current decoded picture. |
| coded_block_flag | coded_block_flag relates to blocks of the size of 4 × 4 picture samples. If coded_block_flag is equal to 0, the block contains no non-zero transform coefficients. If coded_block_flag is equal to 1, the block contains at least one non-zero transform coefficient. |

As can be gathered from the above table, some of these syntax elements relate to a current macroblock in the whole, whereas others relate to sub-parts, i.e., sub-macroblocks or partitions thereof, of a current macroblock. In a similar way, the assignment of a context model to these syntax elements is dependent on syntax elements of either neighboring macroblocks, neighboring sub-macroblocks or neighboring partitions thereof. FIG. 9 illustrates the partition of macroblocks (upper row) and sub-macroblocks (lower row). The partitions are scanned for inter prediction as shown in FIG. 9. The outer rectangles in FIG. 9 refer to the samples in a macroblock or sub-macroblock, respectively. The inner rectangles refer to the partitions. The number in each inner rectangle specifies the index of the inverse macroblock partition scan or inverse sub-macroblock partition scan.

Before describing in detail the dependency of the context model assignment on the syntax element of neighboring blocks, with respect to FIG. 7, it is described, how the addresses of the top macroblock of the macroblock pair to the left and above the current macroblock pair may be computed, since these are the possible candidates, which comprise the syntax element in the block to the left of and above the current block containing the current syntax element to be arithmetically encoded. In order to illustrate the spatial relationships, in FIG. 7, a portion of six macroblock pairs of a video frame is shown, wherein each rectangle region in FIG. 7 corresponds to one macroblock and the first and the second two vertically adjacent macroblocks in each column form a macroblock pair.

In FIG. 7, CurrMbAddr denotes the macroblock address of the top macroblock of the current macroblock pair, the current syntax element is associated with or relates to. The current macroblock pair is encompassed by bold lines. In other words, they from the border of a macroblock pair. mbAddrA and mbAddrB denote the addresses of the top macroblocks of the macroblock pairs to the left and above the current macroblock pair, respectively.

In order to compute the addresses of the top macroblock of the neighboring macroblock pair to the left and above the current macroblock pair, context modeler 112 computes $$MbAddrA = 2 \cdot (CurrMbAddr/2 - 1)$$

$$MbAddrB = 2 \cdot (CurrMbAddr/2 - PicWidthInMbs)$$

where PicWidthInMbs specifies the picture within units of macroblocks. The equations given above can be understood by looking at FIG. 3. It is noted that in FIG. 3 the picture width in units of macroblocks has been denoted i. It is further noted that the equations given above are also true when the current macroblock address CurrMbAddress is interchanged with the odd numbered macroblock address of the bottom macroblock of the current macroblock pair, i.e., CurrMbAddress+1, because in the equation above, "/" denotes an integer division with transaction of the result towards zero. For example, 7/4 and −7/−4 are truncated to 1 and −7/4 and 7/−1 are truncated to −1.

Now, after having described how to compute neighboring macroblocks, it is briefly recalled that each macroblock contains 16×16 luma samples. These luma samples are divided up into four 8×8 luma blocks. These luma blocks may be further subdivided into 4×4 luma blocks. Furthermore, for the following description, each macroblock further comprises 8×8 luma samples, i.e., the pixel width of the chroma samples being doubled compared to luma samples. These 8×8 chroma samples of a macroblock are divided up into four 4×4 luma blocks. The blocks of a macroblock are numbered. Accordingly, the four 8×8 luma blocks each have a respective block address uniquely indicating each 8×8 block in the macroblock. Next, each pixel sample in a macroblock belongs to a position (x, y) wherein (x, y) denotes the luma or chroma location of the upper-left sample of the current block in relation to the upper-left luma or chroma sample of the macroblock. For example, with respect to luma samples, the pixel 23 in top macroblock 252 in FIG. 4b would have the pixel position (2, 1), i.e., third column, second row.

After having described this, the derivation process of ctxIdx for at least some of the bins of syntax elements listed in the above table is described.

With respect to the syntax element mb_skip_flag, the context modeler assignment depends on syntax elements relating to neighboring macroblocks. Thus, in order to determine the context index ctxIdx the addresses mbAddrA and mbAddrB are determined as described above. Then, let condTermN (with N being either A or B) be a variable that is set as follows:
  If mbAddrN is not available or mb_skip_flag for the macroblock mbAddrN is equal to 1, conTermN is set to 0
  Otherwise, condTermN is set to 1.
ctxIdx is derived based on an context index incrementor ctxIdxInc=conTermA+condTermB For the syntax element mb_field_decoding_flag, ctxIdx is determined as follows:
  Let condTermN (with N being either A or B) be a variable that is set as follows.
  If any of the following conditions is true, then condTermN is set to 0,
    mbAddrN is not available
    the macroblock mbAddrN is a frame macroblock.
  Otherwise, condTermN is set to 1.
ctxIdx is derived based on an context index incrementor ctxIdxInc=condTermA+condTermB
wherein mbaddrN is not available, if
  (((CurrMbAddr/2)%(PicWidthInMbs))==0).

For the syntax element Mb_type, ctxIdx is determined dependent on the availability of macroblocks mbAddrN (with N being either A or B), and the syntax element Mb_type of this neighboring macroblocks.

With respect to the other syntax element listed in the above table, the dependency of the context modeler assignment is defined accordingly, wherein for syntax elements, which relate to blocks smaller than a macroblock, the assignment is also dependent on syntax element relating to such smaller blocks being smaller than macroblocks. For example, for the syntax element coded_block_pattern, the context index assignment is dependent not only on the availability of macroblock MbAddrN and the syntax element Mb_type of the macroblock MbAddrN but also on the syntax element Coded_block_pattern of the neighboring block. Further, it is worth noting that the syntax elements listed above are all dependent on the respective syntax element of the neighboring block. Differing thereto, the context model assignment of syntax elements mvd_l0, mvd_l1, ref_idx_l0 and ref_idx_l1 is not dependent on the respective syntax elements of the neighboring block. The context modeler assignment for intra_ chroma_pred_mode is dependent on mbAddrN availability, macroblock mbAddrN being coded in inter prediction mode or not, Mb_type for the macroblock mbAddrN and the syntax element intra_chroma_pred_mode for the macroblock MbAddrN. The syntax element coded_block_flag context model assignment is dependent on the availability of MbAddrN, the current macroblock being coded in inter prediction mode, Mb_type for the macroblock mbAddrN and the syntax element coded_block_flag of the neighboring block.

In the following, it is described, how a neighboring block is determined. In particular, this involves computing mbAddrN and the block index indexing the sub-part of the macroblock MbAddrN, this sub-part being the neighboring block of the current block.

The neighborhood for slices using macroblock adaptive frames/field coding as described in the following in accordance with an embodiment of the present invention is defined in a way that guarantees that the areas covered by neighboring blocks used for context modeling in context adaptive binary arithmetic coding inside an MBAFF-frame adjoin to the area covered by the current block. This generally improves the coding efficiency of a context adaptive arithmetic coding scheme as it is used here in connection with the coding of MBAFF-slices in comparison to considering each macroblock pair as frame macroblock pair for the purpose of context modeling as described in the introductory portion of the specification, since the conditional probabilities estimated during the coding process are more reliable.

The general concept of defining the neighborhood between a current and a reference block is described in the following section 1.1. In section 1.2, a detailed description, which specifies how the neighboring blocks, macroblocks, or partitions to the left of and above the current block, macroblock, or partition are obtained for the purpose of context modeling in context adaptive binary arithmetic coding, is given.

1.1. General Concept Neighborhood Definition

Let (x, y) denote the luma or chroma location of the upper-left sample of the current block in relation to the upper-left luma or chroma sample of the picture CurrPic. The variable CurrPic specifies the current frame, which is obtained by interleaving the top and the bottom field, if the current block is part of a macroblock pair coded in frame mode (mb_field_decoding_flag is equal to 0). If the current block is or is part of a top field macroblock, CurrPic specifies the top field of the current frame; and if the current block is or is part of a bottom field macroblock, CurrPic specifies the bottom field of the current frame.

Let (xA, yA) and (xB, yB) denote the luma or chroma location to the left of and above the location (x, y), respectively, inside the picture CurrPic. The locations (xA, yA) and (xB, yB) are specified by $$(xA, yA) = (x-1, y)$$

$$(xB, yB) = (x, y-1)$$

The block to the left of the current block is defined as the block that contains the luma or chroma sample at location (xA, yA) relative to the upper-left luma or chroma sample of the picture CurrPic and the block above the current block is defined as the block that contains the luma or chroma sample at location (xB, yB) relative to the upper-left luma or chroma sample of the picture CurrPic. If (xA, yA) or (xB, yB) specify a location outside the current slice, the corresponding block is marked as not available.

1.2. Detailed Description of Neighborhood Definition

The algorithm described in Sec. 1.2.1 specifies a general concept for MBAFF-slices that describes how a luma sample location expressed in relation to the upper-left luma sample of the current macroblock is mapped onto a macroblock address, which specifies the macroblock that covers the corresponding luma sample, and a luma sample location expressed in relation to the upper-left luma sample of that macroblock. This concept is used in the following Sec. 1.2.2-1.2.6.

The Sec. 1.2.2-1.2.6 describe how the neighboring macroblocks, 8×8 luma blocks, 4×4 luma blocks, 4×4 chroma block, and partitions to the left of and above a current macroblock, 8×8 luma block, 4×4 luma block, 4×4 chroma block, or partition are specified. These neighboring macroblock, block, or partitions are needed for the context modeling of CABAC for the following syntax elements: mb_skip_flag, mb_type, coded_block_pattern, intra_chroma_pred_mode, coded_block_flag, ref_idx_l0, ref_idx_l1, mvd_l0, mvd_l1.

1.2.1 Specification of Neighboring Sample Locations

Let (xN, yN) denote a given luma sample location expressed in relation to the upper-left luma sample of the current macroblock with the macroblock address CurrMbAddr. It is recalled that in accordance with the present embodiment each macroblock comprises 16×16 luma samples. xN and yN lie within −1 . . . 16. Let mbAddrN be the macroblock address of the macroblock that contains (xN, yN), and let (xW,yW) be the, location (xN, yN) expressed in relation to the upper-left luma sample of the macroblock mbAddrN (rather than relative to the upper-left luma sample of the current macroblock).

Let mbAddrA and mbAddrB specify the macroblock address of the top macroblock of the macroblock pair to the left of the current macroblock pair and the top macroblock of the macroblock pair above the current macroblock pair, respectively. Let PicWidthInMbs be a variable that specifies the picture width in units of macroblocks. mbAddrA and mbAddrB are specified as follows.

$$mbAddrA = 2*(CurrMbAddr/2-1)$$

If mbAddrA is less than 0, or if (CurrMbAddr/2)% PicWidthInMbs is equal to 0, or if the macroblock with address mbAddrA belongs to a different slice than the current slice, mbAddrA is marked as not available.

$$mbAddrB = 2*(CurrMbAddr/2-PicWidthInMbs)$$

If mbAddrB is less than 0, or if the macroblock with address mbAddrB belongs to a different slice than the current slice, mbAddrB is marked as not available.

The Table in FIG. 8 specifies the macroblock address mbAddrN and a variable yM in the following two ordered steps:

1. Specification of a macroblock address mbAddrX (fifth column) depending on (xN, yN) (first and second column) and the following variables:

The variable currMbFrameFlag (third column) is set to 1, if the current macroblock with address CurrMbAddr is a part of a frame macroblock pair; otherwise it is set to 0.

The variable mb1sTopMbFlag (forth column) is set to 1, if CurrMbAddr %2 is equal to 0; otherwise it is set to 0.

2. Depending on the availability of mbAddrX (fifth column), the following applies:

If mbAddrX (which can be either mbAddrA or mbAddrB) is marked as not available, mbAddrN is marked as not available.

Otherwise (mbAddrX is available), mbAddrN is marked as available and Table 1 specifies mbAddrN and yM depending on (xN, yN) (first and second column), currMbFrameFlag (third column), mblsTopMbFlag (forth column), and the variable mbAddrXFrameFlag (sixth column), which is derived as follows:

mbAddrXFrameFlag is set to 1, if the macroblock mbAddrX is a frame macroblock; otherwise it is set to 0.

Unspecified values of the above flags in Table 1 indicate that the value of the corresponding flags is not relevant for the current table rows.

To summarize: in the first four columns, the input values xN, yN, currMbFrameFlag and MblsTopMbFlag are entered. In particular, the possible input values for parameters xN and yN are −1 to 16, inclusive. These parameters determine mbAddrX listed in the fifth column, i.e. the macroblock pair containing the wanted luma sample. The next two columns, i.e., the sixth and the seventh column, are needed to obtain the final output mbAddrN and yN. These further input parameters are MbAddrXFrameFlag indicating as to whether a macroblock pair indicated by mbAddrX is frame or field coded, and some additional conditions concerning as to whether yN is even or odd numbered or is greater than or equal to 8 or not.

As can be seen, when xN and yN are both positive or zero, i.e., the wanted pixel sample lies within the current macroblock relative to which xN and yN are defined, the output macroblock address does not change, i.e., it is equal to CurrMbAddr. Moreover, yM is equal yM. This changes when the input xM and yM indicates a pixel sample lying outside the current macroblock, i.e., to the left (xN<0) all to the top of the current macroblock (yN<0).

Outgoing from the result of the table of FIG. 8, the neighboring luma location (xW, yW) relative to the upper-left luma sample of the macroblock-mbAddrN is specified as $$xW=(xN+16)\%16$$

$$yW=(yM+16)\%16.$$

It is emphasized that the aforementioned considerations pertained for illustrative purposes merely luma samples. The considerations are slightly different when considering chroma samples since a macroblock contains merely 8×8 chroma samples.

1.2.2 Specification of Neighboring Macroblocks

The specification of the neighboring macroblocks to the left of and above the current macroblock is used for the context modeling of CABAC for the following syntax elements: mb_skip_flag, mb_type, coded_block_pattern, intra_chroma_prediction_mode, and coded_block_flag.

Let mbAddrA be the macroblock address of the macroblock to the left of the current macroblock, and mbAddrB be the macroblock address of the macroblock above the current macroblock.

mbAddrA, mbAddrB, and their availability statuses are obtained as follows:

mbAddrA and its availability status are obtained as described in Sec. 1.2.1 given the luma location (xN, yN)=(−1, 0).

mbAddrB and its availability status are obtained as described in Sec. 1.2.1 given the luma location (xN, yN)=(0, −1).

1.2.3 Specification of Neighboring 8×8 Luma Blocks

The specification of the neighboring 8×8 luma blocks to the left of and above the current 8×8 luma block is used for the context modeling of CABAC for the syntax element coded_block_pattern.

Let luma8×8BlkIdx be the index of the current 8×8 luma block inside the current macroblock CurrMbAddr. An embodiment of the assignment of block index luma8×8BlkIdx to the respective blocks within a macroblock is shown in FIG. 9 (upper-right corner).

Let mbAddrA be the macroblock address of the macroblock that contains the 8×8 luma block to the left of the current 8×8 luma block, and let mbAddrB be the macroblock address of the macroblock that contains the 8×8 luma block above the current 8×8 luma block. Further, let luma8×8BlkIdxA be the 8×8 luma block index (inside the macroblock mbAddrA) of the 8×8 luma block to the left of the current 8×8 luma block, and let luma8×8BlkIdXB be the 8×8 luma block index (inside the macroblock mbAddrB) of the 8×8 luma block above the current 8×8 luma block.

mbAddrA, mbAddrB, luma8×8BlkIdxA, luma8×8BlkIdxB, and their availability statuses are obtained as follows:

Let (xC, yC) be the luma location of the upper-left sample of the current 8×8 luma block relative to the upper-left luma sample of the current macroblock.

mbAddrA, its availability status, and the luma location (xW, yW) are obtained as described in Sec. 1.2.1 given the luma location (xN, yN)=(xC−1, yC). If mbAddrA is available, then luma8×8BlkIdxA is set in a way that it refers to the 8×8 luma block inside the macroblock mbAddrA that covers the luma location (xW, yW); otherwise, luma8×8BlkIdA is marked as not available.

mbAddrB, its availability status, and the luma location (xW, yW) are obtained as described in Sec. 1.2.1 given the luma location (xN, yN)=(xC, yC−1). If mbAddrB is available, then luma8×8BlkIdxB is set in a way that it refers to the 8×8 luma block inside the macroblock mbAddrB that covers the luma location (xW, yW); otherwise, luma8×8BlkIdxB is marked as not available.

1.2.4 Specification of Neighboring 4×4 Luma Blocks

The specification of the neighboring 4×4 luma blocks to the left of and above the current 4×4 luma block is used for the context modeling of CABAC for the syntax element coded_block_flag.

Let luma4×4BlkIdx be the index (in decoding order) of the current 4×4 luma block inside the current macroblock CurrMbAddr. For example, luma4×4BlkIdx could be defined as luma8×8BlkIdx of the 8×8 block containing the 4×4 block multiplied by 4 plus the partition number as shown in the bottom-right corner of FIG. 9.

Let mbAddrA be the macroblock address of the macroblock that contains the 4×4 luma block to the left of the current 4×4 luma block, and let mbAddrB be the macroblock address of the macroblock that contains the 4×4 luma block above the current 4×4 luma block.

Further, let luma4×4BlkIdxA be the 4×4 luma block index (inside the macroblock mbAddrA) of the 4×4 luma block to the left of the current 4×4 luma block, and let luma4×4BlkIdxB be the 4×4 luma block index (inside the macroblock mbAddrB) of the 4×4 luma block above the current 4×4 luma block.

mbAddrA, mbAddrB, luma4×4BlkIdxA, luma4×4BlkIdxB, and their availability statuses are obtained as follows:

Let (xC, yC) be the luma location of the upper-left sample of the current 4×4 luma block relative to the upper-left luma sample of the current macroblock.

mbAddrA, its availability status, and the luma location (xW, yW) are obtained as described in Sec. 1.2.1 given the luma location (xN, yN)=(xC−1, yC). if mbAddrA is available, then luma4×4BlkIdxA is set in a way that it refers to the 4×4 luma block inside the macroblock mbAddrA that covers the luma location (xW, yW); otherwise, luma4×4BlkIdxA is marked as not available.

mbAddrB, its availability status, and the luma location (xW, yW) are obtained as described in Sec. 1.2.1 given the luma location (xN, yN)=(xC, yC−1). If mbAddrB is available, then luma4×4BlkIdxB is set in a way that it refers to the 4×4 luma block inside the macroblock mbAddrB that covers the luma location (xW, yW); otherwise, luma4×4BlkIdxB is marked as not available.

1.2.5 Specification of Neighboring 4×4 Chroma Blocks

The specification of the neighboring 4×4 chroma blocks to the left of and above the current 4×4 chroma block is used for the context modeling of CABAC for the syntax element coded_block_flag.

Let chroma4×4BlkIdx be the index (in decoding order) of the current 4×4 chroma block inside the current macroblock CurrMbAddr.

Let mbAddrA be the macroblock address of the macroblock that contains the 4×4 chroma block to the left of the current 4×4 chroma block, and let mbAddrB be the macroblock address of the macroblock that contains the 4×4 chroma block above the current 4×4 chroma block. Further, let chroma4×4BlkIdxA be the 4×4 chroma block index (inside the macroblock mbAddrA) of the 4×4 chroma block to the left of the current 4×4 chroma block, and let chroma4×4BlkIdxB be the 4×4 chroma block index (inside the macroblock mbAddrB) of the 4×4 chroma block above the current 4×4 chroma block.

mbAddrA, mbAddrB, chroma4×4BlkIdxA, chroma4×4BlkIdxB, and their availability statuses are obtained as follows:

Given luma8×8BlkIdx=chroma4×4BlkIdx, the variables mbAddrA, mbAddrB, luma8×8BlkIdxA, luma8×8BlkIdxB, and their availability statuses are obtained as described in Sec. 1.2.3.

If luma8×8BlkIdxA is available, chroma4×4BlkIdxA is set equal to luma8×8BlkIdxA; otherwise chroma4×4BlkIdxA is marked as not available.

If luma8×8BlkIdxB is available, chroma4×4BlkIdxB is set equal to luma8×8BlkIdxB; otherwise chroma4×4BlkIdxB is marked as not available.

1.2.6 Specification of Neighboring Partitions

The specification of the neighboring partitions to the left of and above the current partition is used for the context modeling of CABAC for the following syntax elements: ref_idx_l0, ref_idx_l1, mvd_l0, mvd_l1.

Let mbPartIdx and subMbPartIdx be the macroblock partition and sub-macroblock partition indices that specify the current partition inside the current macroblock CurrMbAddr. An example for such partition indices is shown in FIG. 9.

Let mbAddrA be the macroblock address of the macroblock that contains the partition to the left of the current partition, and let mbAddrB be the macroblock address of the macroblock that contains the partition above the current partition. Further, let mbPartIdxA and subMbPartIdxA be the macroblock partition and sub-macroblock partition indices (inside the macroblock mbAddrA) of the partition to the left of the current partition, and let mbPartIdxB and subMbPartIdxB be the macroblock partition and sub-macroblock partition indices (inside the macroblock mbAddrB) of the partition above the current partition.

mbAddrA, mbAddrB, mbPartIdxA, subMbPartIdxA, mbPartIdxB, subMbPartIdxB, and their availability statuses are obtained as follows:

Let (xC, yC) be the luma location of the upper-left sample of the current partition given by mbPartIdx and subMbPartIdx relative to the upper-left luma sample of the current macroblock.

mbAddrA, its availability status, and the luma location (xW, yW) are obtained as described in Sec. 1.2.1 given the luma location (xN,yN)=(xC−1, yC). If mbAddrA is not available, mbPartIdxA and subMbPartIdxA are marked as not available; otherwise mbPartIdxA is set in away that it refers to the macroblock partition inside the macroblock mbAddrA that covers the luma location (xW, yW), and subMbPartIdxA is set in a way that it refers to the sub-macroblock partition inside the macroblock partition mbPartIdxA (inside the macroblock mbAddrA) that covers the luma location (xW, yW).

mbAddrB, its availability status, and the luma location (xW, yW) are obtained as described in Sec. 1.2.1 given the luma location (xN, yN)=(xC, yC−1). If mbAddrB is not available, mbPartIdxB and subMbPartIdxB are marked as not available; otherwise mbPartIdxB is set in away that it refers to the macroblock partition inside the macroblock mbAddrB that covers the luma location (xW, yW), and subMbPartIdxB is set in a way that it refers to the sub-macroblock partition inside the macroblock partition mbPartIdxB (inside the macroblock mbAddrB) that covers the luma location (xW, yW).

After having described how to encode the above syntax elements or the bin strings or part of their bins into an arithmetically coded bit stream, the decoding of said bit stream and the retrieval of the bins is described with respect to FIGS. 10 to 12

FIG. 10 shows a general view of a video decoder environment to which the present invention could be applied. An entropy decoder 400 receives the arithmetically coded bit stream as described above and treats it as will be described in more detail below with respect to FIGS. 11-12. In particular, the entropy decoder 400 decodes the arithmetically coded bit stream by binary arithmetic decoding in order to obtain the precoded video signal and, in particular, syntax elements contained therein and passes same to a precode decoder 402. The precode decoder 402 uses the syntax elements, such as motion vector components and flags, such as the above listed syntax elements, in order to retrieve, macroblock by macroblock and then slice after slice, the picture samples of pixels of the video frames 10.

FIG. 11 now shows the decoding process performed by the entropy decoder 400 each time a bin is to be decoded. Which bin is to be decoded depends on the syntax element which is currently expected by entropy decoder 400. This knowledge results from respective parsing regulations.

In the decoding process, first, in step 500, the decoder 400 checks as to whether the next bin to decode is a bin of a syntax element of the type corresponding to context model assignment based on neighboring syntax elements. If this is not the case, decoder 400 proceeds to another syntax element handling in step 504. However, if the check result in step 500 is positive, decoder 400 performs in steps 506 and 508 a determination of the neighboring block of the current block which the current bin to decode belongs to and an assignment of a context model to the bin based on a predetermined attribute of the neighboring block determined in step 506, wherein steps 506 and 508 correspond to steps 306 and 308 of encoding process of FIG. 5. The result of these steps is the context index ctxIdx. Accordingly, the determination of ctxIdx is performed in steps 506 and 508 in the same way as in the encoding process of FIG. 5 in steps 306 and 308 in order to determine the context model to be used in the following arithmetical decoding.

Then, in step 522, the entropy decoder 400 arithmetically decodes the actual bin, from the arithmetically coded bit stream by use of the actual probability state of the context module as indexed by ctxIdx obtained in steps 510 to 520. The result of this step is the value for the actual bin. Thereafter, in step 524, the ctxIdx probability state is adapted or updated, as it was the case in step 224. Thereafter, the process ends at step 526.

Of course, the individual bins that are obtained by the process shown in FIG. 11 represent the syntax element value merely in case the syntax element is of a binary type. Otherwise, a step corresponding to the binarization has to be performed in reverse manner in order to obtain from the bin strings the actual value of the syntax element.

FIG. 12 shows the steps 522 and 524 being encompassed by dotted line 527 in more detail on the left hand side. On the right hand side, indicated with 564, FIG. 11 shows a memory and its content to which decoder 400 has access in order to load, store and update variables. As can be seen, entropy decoder manipulates or manages the same variables as entropy coder 14 since entropy decoder 400 emulates the encoding process as will be described in the following.

In a first step 566, decoder 400 determines the value $R_{LPS}$, i.e. the range of the subinterval corresponding to the next bin being the LPS, based on R and $\sigma_i$. Thus, step 566 is identical to step 330. Then, in step 568, decoder 400 computes $R_{MPS}=R-R_{LPS}$ with $R_{MPS}$ being the range of the subinterval associated with the most probable symbol. The current interval from L to R is thus subdivided into subintervals L to $L+R_{MPS}$ and $L+R_{MPS}$ to L+R. Now, in step 570 decoder 400 checks as to whether the value of the arithmetic coding codeword in the arithmetically coded bit stream falls into the lower or upper subinterval. The decoder 400 knows that the actual symbol bin, is the most probable symbol as indicated by $\omega_i$ when the value of the arithmetic codeword falls into the lower subinterval and accordingly sets the bin value to the value of $\omega_i$ in step 572. In case the value falls into the upper subinterval, decoder 400 sets the symbol to be $1-\omega_i$ in step 574. After step 572, the decoder 400 actualizes the decoder state or the current interval as defined by R and L by setting R to be $R_{MPS}$ in step 574. Then, in step 576, the decoder 400 adapts or updates the probability state of the current context model i as defined by $\sigma_i$ and $\omega_i$ by transitioning the probability state index $\sigma_i$ as was described with respect to step 338 in FIG. 9. Thereafter, the process 527 ends at step 578.

After step 574, the decoder actualizes the decoder state in step 580 by computing L=L+R and $R=R_{LPS}$. Thereafter, the decoder 400 adapts or updates the probability state in steps 582 and 584 by computing $\omega_i=1-\omega_i$ in step 582, if $\sigma_i$ is equal to 0, and transitioning the probability state index $\sigma_i$ to a new probability state index in the same way as described with respect to step 346 in FIG. 9. Thereafter, the process ends at step 578.

After having described the present invention with respect to the specific embodiments, it is noted that the present invention is not restricted to these embodiments. In particular, the present invention is not restricted to the specific examples of syntax elements. Moreover, the assignment in accordance with steps 308 and 408 does not have to be dependent on syntax elements of neighboring blocks, i.e., syntax elements contained in the precoded video signal output by precoder 12. Rather, the assignment may be dependent on other attributes of the neighboring blocks. Moreover, the definition of neighborhoods between neighboring blocks is described with respect to the table of FIG. 8 may be varied. Further, the pixel samples of the two interlaced fields could be arranged in another way than described above.

Moreover, other block sizes than 4×4 blocks could be used as a basis for the transformation, and, although in the above embodiment the transformation was applied to picture sample differences to a prediction, the transformation could be as well applied to the picture sample itself without performing a prediction. Furthermore, the type of transformation is not critical. DCT could be used as well as a FFT or wavelet transformation. Furthermore, the present invention is not restricted to binary arithmetic encoding/decoding. The present invention can be applied to multi-symbol arithmetic encoding as well. Additionally, the sub-divisions of the video frame into slices, macroblock pairs, macroblocks, picture elements etc. was for illustrating purposes only, and this is not to restrict the scope of the invention to this special case.

In the following, reference is made to FIG. 13 to show, in more detail than in FIG. 1, the complete setup of a video encoder engine including an entropy-encoder as it is shown in FIG. 13 in block 800 in which the aforementioned arithmetic coding of syntax elements by use of a context assignment based on neighboring syntax elements is used. In particular, FIG. 13 shows the basic coding structure for the emerging H.264/AVC standard for a macroblock. The input video signal is, split into macroblocks, each macroblock having 16×16 luma pixels. Then, the association of macroblocks to slice groups and slices is selected, and, then, each macroblock of each slice is processed by the network of operating blocks in FIG. 13. It is to be noted here that an efficient parallel processing of macroblocks is possible, when there are various slices in the picture. The association of macroblocks to slice groups and slices is performed by means of a block called coder control 802 in FIG. 13. There exist several slices, which are defined as follows:

I slice: A slice in which all macroblocks of the slice are coded using intra prediction.

P slice: In addition, to the coding types of the I slice, some macroblocks of the P slice can also be coded using inter prediction with at most one motion-compensated prediction signal per prediction block.

B slice: In addition, to the coding types available in a P slice, some macroblocks of the B slice can also be coded using inter prediction with two motion-compensated prediction signals per prediction block.

The above three coding types are very similar to those in previous standards with the exception of the use of reference pictures as described below. The following two coding types for slices are new:

SP slice: A so-called switching P slice that is coded such that efficient switching between different precoded pictures becomes possible.

SI slice: A so-called switching I slice that allows an exact match of a macroblock in an SP slice for random access and error recovery purposes.

Slices are a sequence of macroblocks, which are processed in the order of a raster scan when not using flexible macroblock ordering (FMO). A picture maybe split into one or several slices as shown in FIG. 15. A picture is therefore a collection of one or more slices. Slices are self-contained in the sense that given the active sequence and picture parameter sets, their syntax elements can be parsed from the bit stream and the values of the samples in the area of the picture that the slice represents can be correctly decoded without use of data from other slices provided that utilized reference pictures are identical at encoder and decoder. Some information from other slices maybe needed to apply the deblocking filter across slice boundaries.

FMO modifies the way how pictures are partitioned into slices and macroblocks by utilizing the concept of slice groups. Each slice group is a set of macroblocks defined by a macroblock to slice group map, which is specified by the content of the picture parameter set and some information from slice headers. The macroblock to slice group map consists of a slice group identification number for each macroblock in the picture, specifying which slice group the associated macroblock belongs to. Each slice group can be partitioned into one or more slices, such that a slice is a sequence of macroblocks within the same slice group that is processed in the order of a raster scan within the set of macroblocks of a particular slice group. (The case when FMO is not in use can be viewed as the simple special case of FMO in which the whole picture consists of a single slice group.)

Using FMO, a picture can be split into many macroblock-scanning patterns such as interleaved slices, a dispersed macroblock allocation, one or more "foreground" slice groups and a "leftover" slice group, or a checker-board type of mapping.

Each macroblock can be transmitted in one of several coding types depending on the slice-coding type. In all slice-coding types, the following types of intra coding are supported, which are denoted as Intra_4×4 or Intra_16×16 together with chroma prediction and I_PCM prediction modes.

The Intra_4×4 mode is based on predicting each 4×4 luma block separately and is well suited for coding of parts of a picture with significant detail. The Intra_16×16 mode, on the other hand, does prediction of the whole 16×16 luma block and is more suited for coding very smooth areas of a picture.

In addition, to these two types of luma prediction, a separate chroma prediction is conducted. As an alternative to Intra_4×4 and Intra_16×16, the I_PCM coding type allows the encoder to simply bypass the prediction and transform coding processes and instead directly send the values of the encoded samples. The I_PCM mode serves the following purposes:
1. It allows the encoder to precisely represent the values of the samples
2. It provides a way to accurately represent the values of anomalous picture content without significant data expansion
3. It enables placing a hard limit on the number of bits a decoder must handle for a macroblock without harm to coding efficiency.

In contrast to some previous video coding standards (namely H.263+ and MPEG-4 Visual), where intra prediction has been conducted in the transform domain, intra prediction in H.264/AVC is always conducted in the spatial domain, by referring to the bins of neighboring samples of previously coded blocks which are to the left and/or above the block to be predicted. This may incur error propagation in environments with transmission errors that propagate due to motion compensation into inter-coded macroblocks. Therefore, a constrained intra coding mode can be signaled that allows prediction only from intra-coded neighboring macroblocks.

When using the Intra_4×4 mode, each 4×4 block is predicted from spatially neighboring samples as illustrated on the left-hand side of FIG. 16. The 16 samples of the 4×4 block, which are labeled as a-p, are predicted using prior decoded samples in adjacent blocks labeled as A-Q. For each 4×4 block one of nine prediction modes can be utilized. In addition, to "DC" prediction (where one value is used to predict the entire 4×4 block), eight directional prediction modes are specified as illustrated on the right-hand side of FIG. 14. Those modes are suitable to predict directional structures in a picture such as edges at various angles.

In addition, to the intra macroblock coding types, various predictive or motion-compensated coding types are specified as P macroblock types. Each P macroblock type corresponds to a specific partition of the macroblock into the block shapes used for motion-compensated prediction. Partitions with luma block sizes of 16×16, 16×8, 8×16, and 8×8 samples are supported by the syntax. In case partitions with 8×8 samples are chosen, one additional syntax element for each 8×8 partition is transmitted. This syntax element specifies whether the corresponding 8×8 partition is further partitioned into partitions of 8×4, 4×8, or 4×4 luma samples and corresponding chroma samples.

The prediction signal for each predictive-coded M×N luma block is obtained by displacing an area of the corresponding reference picture, which is specified by a translational motion vector and a picture reference index. Thus, if the macroblock is coded using four 8×8 partitions and each 8×8 partition is further split into four 4×4 partitions, a maximum of sixteen motion vectors may be transmitted for a single P macroblock.

The quantization parameter SliceQP is used for determining the quantization of transform coefficients in H.264/AVC. The parameter can take 52 values. Theses values are arranged so that an increase of 1 in quantization parameter means an increase of quantization step size by approximately 12% (an increase of 6 means an increase of quantization step size by exactly a factor of 2). It can be noticed that a change of step size by approximately 12% also means roughly a reduction of bit rate by approximately 12%.

The quantized transform coefficients of a block generally are scanned in a zig-zag fashion and transmitted using entropy coding methods. The 2×2 DC coefficients of the chroma component are scanned in raster-scan order. All inverse transform operations in H.264/AVC can be implemented using only additions and bit-shifting operations of 16-bit integer values. Similarly, only 16-bit memory accesses are needed for a good implementation of the forward transform and quantization process in the encoder.

The entropy encoder 800 in FIG. 13 in accordance with a coding arrangement described above with respect to FIG. 2. A context modeler feeds a context model, i.e., a probability information, to an arithmetic encoder, which is also referred to as the regular coding engine. The to be encoded bit, i.e. a bin, is forwarded from the context modeler to the regular coding engine. This bin value is also fed back to the context modeler so that a context model update can be obtained. A bypass branch is provided, which includes an arithmetic encoder, which is also called the bypass coding engine. The bypass coding engine is operative to arithmetically encode the input bin values. Contrary to the regular coding engine, the bypass coding engine is not an adaptive coding engine but works preferably with a fixed probability model without any context adaption. A selection of the two branches can be obtained by means of switches. The binarizer device is operative to binarize non-binary valued syntax elements for obtaining a bin string, i.e., a string of binary values. In case the syntax element is already a binary value syntax element, the binarizer is bypassed.

Therefore, in CABAC (CABAC=Context-based Adaptive Binary Arithmetic Coding) the encoding process consists of at most three elementary steps:
1. binarization
2. context modeling
3. binary arithmetic coding In the first step, a given non-binary valued syntax element is uniquely mapped to a binary sequence, a so-called bin string. When a binary valued syntax element is given, this initial step is bypassed, as shown in FIG. 2. For each element of the bin string or for each binary valued syntax element, one or two subsequent steps may follow depending on the coding mode.

In the co-called regular coding mode, prior to the actual arithmetic coding process the given binary decision, which, in the sequel, we will refer to as a bin, enters the context modeling stage, where a probability model is selected such that the corresponding choice may depend on previously encoded syntax elements or bins. Then, after the assignment of a context model the bin value along with its associated model is passed to the regular coding engine, where the final stage of arithmetic encoding together with a subsequent model updating takes place (see FIG. 2).

Alternatively, the bypass coding mode is chosen for selected bins in order to allow a speedup of the whole encoding (and decoding) process by means of a simplified coding engine without the usage of an explicitly assigned model. This mode is especially effective when coding the bins of the primary suffix of those syntax elements, concerning components of differences of motion vectors and transform coefficient levels.

In the following, the three main functional building blocks, which are binarization, context modeling, and binary arithmetic coding in the encoder of FIG. 13, along with their interdependencies are discussed in more detail.

In the following, several details on binary arithmetic coding will be set forth.

Binary arithmetic coding is based on the principles of recursive interval subdivision that involves the following elementary multiplication operation. Suppose that an estimate of the probability $p_{LPS} \in (0, 0.5]$ of the least probable symbol (LPS) is given and that the given interval is represented by its lower bound L and its width (range) R. Based on that settings, the given interval is subdivided into two sub-intervals: one interval of width $$R_{LPS} = R \times p_{LPS},$$

which is associated with the LPS, and the dual interval of width $R_{MPS} = R - R_{LPS}$, which is assigned to the most probable symbol (MPS) having a probability estimate of $1 - p_{LPS}$. Depending on the observed binary decision, either identified as the LPS or the MPS, the corresponding sub-interval is then chosen as the new current interval. A binary value pointing into that interval represents the sequence of binary decisions processed so far, whereas the range of the interval corresponds to the product of the probabilities of those binary symbols. Thus, to unambiguously identify that interval and hence the coded sequence of binary decisions, the Shannon lower bound on the entropy of the sequence is asymptotically approximated by using the minimum precision of bits specifying the lower bound of the final interval.

An important property of the arithmetic coding as described above is the possibility to utilize a clean interface between modeling and coding such that in the modeling stage, a model probability distribution is assigned to the given symbols, which then, in the subsequent coding stage, drives the actual coding engine to generate a sequence of bits as a coded representation of the symbols according to the model distribution. Since it is the model that determines the code and its efficiency in the first place, it is of importance to design an adequate model that explores the statistical dependencies to a large degree and that this model is kept "up to date" during encoding. However, there are significant model costs involved by adaptively estimating higher-order conditional probabilities.

Suppose a pre-defined set T□ of past symbols, a so-called context template, and a related set C={0, . . . , C−1} of contexts is given, where the contexts are specified by a modeling function F. For each symbol x to be coded, a conditional probability p(x|F(z)) is estimated by switching between different probability models according to the already coded neighboring symbols z∈□T. After encoding x using the estimated conditional probability p(x|F(z)) is estimated on the flyby tracking the actual source statistics. Since the number of different conditional probabilities to be estimated for an alphabet size of m is high, it is intuitively clear that the model cost, which represents the cost of "learning" the model distribution, is proportional to the number of past symbols to the power of four□□

This implies that by increasing the number C of different context models, there is a point, where overfitting of the model may occur such that inaccurate estimates of p(x|F(z)) will be the result.

This problem is solved in the encoder of FIG. 12 by imposing two severe restrictions on the choice of the context models. First, very limited context templates T consisting of a few neighbors of the current symbol to encode are employed such that only a small number of different context models C is effectively used.

Secondly, context modeling is restricted to selected bins of the binarized symbols and is of especially advantage with respect to primary prefix and suffix of the motion vector differences and the transform coefficient levels but which is also true for other syntax elements. As a result, the model cost is drastically reduced, even though the ad-hoc design of context models under these restrictions may not result in the optimal choice with respect to coding efficiency.

Four basic design types of context models can be distinguished. The first type involves a context template with up to two neighboring syntax elements in the past of the current syntax element to encode, where the specific definition of the kind of neighborhood depends on the syntax element. Usually, the specification of this kind of context model for a specific bin is based on a modeling function of the related bin values for the neighboring element to the left and on top of the current syntax element, as shown in FIG. 13, and as was described above with respect to FIG. 5-12. This design type of context modeling corresponds to the above description.

The second type of context models is only defined for certain data subtypes. For this kind of context models, the values of prior coded bins ($b_0, b_1, b_2, \ldots, b_{i-1}$) are used for the choice of a model for a given bin with index i. Note that these context models are used to select different models for different internal nodes of a corresponding binary tree.

Both the third and fourth type of context models is applied to residual data only. In contrast to all other types of context models, both types depend on context categories of different block types. Moreover, the third type does not rely on past coded data, but on the position in the scanning path. For the fourth type, modeling functions are specified that involve the evaluation of the accumulated number of encoded (decoded) levels with a specific value prior to the current level bin to encode (decode).

Besides these context models based on conditional probabilities, there are fixed assignments of probability models to bin indices for all those bins that have to be encoded in regular mode and to which no context model of the previous specified category can be applied.

The above described context modeling is suitable for a video compression engine such as video compression/decompression engines designed in accordance with the presently emerging H.264/AVC video compression standard. To summarize, for each bin of a bin string the context modeling, i.e., the assignment of a context variable, generally depends on the to be processed data type or sub-data type, the precision of the binary decision inside the bin string as well as the values of previously coded syntax elements or bins. With the exception of special context variables, the probability model of a context variable is updated after each usage so that the probability model adapts to the actual symbol statistics.

A specific example for a context-based adaptive binary arithmetic coding scheme to which the assignment of context model of the above embodiments could be applied is described in: D. Marpe, G. Blättermann, and T. Wiegand, "Adaptive codes for H.26L," ITU-T SG16/Q.6 Doc. VCEG-L13, Eibsee, Germany, January 2003-07-10.

It is noted that the above described steps in the above described flow charts could be implemented in software, for example in individual routines, or in Hardware, for example in an ASIC.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A non-transitory computer readable digital storage medium having stored thereon a computer program having a program code for performing, when running on a computer, a method for encoding a video signal representing at least one video frame, with the at least one video frame being composed of picture samples, the picture samples belonging either to a first or a second field being captured at different time instants, the video frame being spatially divided up into macroblock pair regions, each macroblock pair region being associated with a top and a bottom macroblock, the method comprising the following steps:

deciding, for each macroblock pair region, as to whether the respective macroblock pair region is of a frame coded or a field coded distribution type;

assigning, for each macroblock pair region, each of the pixel samples in the respective macroblock pair region to a respective one of the top and bottom macroblocks of the respective macroblock pair region, in accordance with the distribution type of the respective macroblock pair region;

pre-coding the video signal into a pre-coded video signal, including motion prediction of the macroblocks in units of partitions thereof to obtain, for each macroblock, a syntax element specifying, for a predetermined one of the partitions of a respective macroblock, an index of a reference picture;

determining, for the syntax element of a current macroblock associated with a current macroblock pair region of the macroblock pair regions, a neighboring macroblock to the left of the current macroblock at least based upon as to whether the current macroblock pair region is of the frame or field coded distribution type such that if the current macroblock pair region is of the field coded distribution type, the neighboring macroblock to the left of the current macroblock is determined to be a bottom macroblock of a macroblock pair region to the left of the current macroblock pair region, if the macroblock pair region to the left is also of the field coded distribution type and the current macroblock is the bottom macroblock of the current macroblock pair region, and the neighboring macroblock to the left of the current macroblock is determined to be a top macroblock of the macroblock pair region to the left of the current macroblock pair region, if the macroblock pair region to the left is of the frame coded distribution type, or if the macroblock pair region to the left is of the field coded distribution type with the current macroblock being the top macroblock of the current macroblock pair region, and if the current macroblock pair region is of the frame coded distribution type, the neighboring macroblock to the left of the current macroblock is determined to be the bottom macroblock of the macroblock pair region to the left of the current macroblock pair region, if the macroblock pair region to the left is also of the frame coded distribution type and the current macroblock is the bottom macroblock of the current macroblock pair region, and the neighboring macroblock to the left of the current macroblock is determined to be the top macroblock of the macroblock pair region to the left of the current macroblock pair region, if the macroblock pair region to the left is of the field coded distribution type, or if the macroblock pair region to the left is of the frame coded distribution type with the current macroblock being the top macroblock of the current macroblock pair region and;

a neighboring macroblock to the top of the current macroblock at least based upon as to whether the current macroblock pair region is of a frame or field coded distribution type such that if the current macroblock pair region is of the frame coded distribution type the neighboring macroblock to the top of the current macroblock is determined to be a top macroblock of the current macroblock pair region if the current macroblock is the bottom macroblock of the current macroblock pair region, and a bottom macroblock of the macroblock pair region to the top of the current macroblock pair region if the current macroblock is the top macroblock of the current macroblock pair region, if the current macroblock pair region is of the field coded distribution type and the current macroblock is the top macroblock of the current macroblock pair region, the neighboring macroblock to the top of the current macroblock is determined to be the bottom macroblock of the macroblock pair region to the top of the current macroblock pair region, if the macroblock pair region to the top of the current macroblock pair region is of the frame coded distribution type, the top macroblock of the macroblock pair region to the top of the current macroblock pair region, if the macroblock pair region to the top of the current macroblock pair region is of the field coded distribution type, if the current macroblock pair region is of the field coded distribution type and the current macroblock is the bottom macroblock of the current macroblock pair region, the neighboring macroblock to the top of the current macroblock is determined to be the bottom macroblock of the macroblock pair region to the top of the current macroblock pair region, assigning one of at least two context models to the current syntax element of the current macroblock based on a pre-determined attribute of the neighboring macroblock to the left of the current macroblock and the neighboring macroblock to the top of the current macroblock, wherein each context model is associated with a different probability estimation; and arithmetically encoding the syntax element of the current macroblock into a coded bit stream based on the probability estimation with which the assigned context model is associated.

2. A non-transitory computer readable digital storage medium having stored thereon a computer program having a program code for performing, when running on a computer, a method for decoding a predetermined syntax element among syntax elements of a coded bit stream from the coded bit stream, the coded bit stream being an arithmetically encoded version of a pre-coded video signal, the pre-coded video signal being a pre-coded version of a video signal, the video signal representing at least one video frame being composed of picture samples, the picture samples belonging either to a first or a second field being captured at a different time instants, the video frame being spatially divided up into macroblock pair regions, each macroblock pair region being associated with a top and a bottom macroblock, each macroblock pair region being either of a frame coded or a field coded distribution type, wherein, for each macroblock pair region, each of the pixel samples in the respective macroblock pair region is assigned to a respective one of the top and bottom macroblock of the respective macroblock pair region in accordance with the distribution type of the respective macroblock pair region, wherein each of the macroblocks is associated with a respective one of the syntax elements, the predetermined syntax element relating to a predetermined macroblock of the top and bottom macroblocks of a predetermined macroblock pair region of the macroblock pair regions and specifies, for a predetermined one of partitions of the predetermined macroblock, an index of a reference picture used in motion prediction of the predetermined macroblock, wherein the method comprises the following steps being performed by a decoder:

determining, for the predetermined syntax element, a neighboring macroblock to the left of the predetermined macroblock, at least based upon as to whether the predetermined macroblock pair region is of the frame or field coded distribution type such that if the predetermined macroblock pair region is of the field coded distribution type, the neighboring macroblock to the left of the predetermined macroblock is determined to be a bottom macroblock of a macroblock pair region to the left of the predetermined macroblock pair region, if the macroblock pair region to the left is also of the field coded distribution type and the predetermined macroblock is the bottom macroblock of the predetermined macroblock pair region, and the neighboring macroblock to the left of the predetermined macroblock is determined to be a top macroblock of the macroblock pair region to the left of the predetermined macroblock pair region, if the macroblock pair region to the left is of the frame coded distribution type, or if the macroblock pair region to the left is of the field coded distribution type with the predetermined macroblock being the top macroblock of the predetermined macroblock pair region, and if the predetermined macroblock pair region is of the frame coded distribution type, the neighboring macroblock to the left of the predetermined macroblock is determined to be the bottom macroblock of the macroblock pair region to the left of the predetermined macroblock pair region, if the macroblock pair region to the left is also of the frame coded distribution type and the predetermined macroblock is the bottom macroblock of the predetermined macroblock pair region, and the neighboring macroblock to the left of the predetermined macroblock is determined to be the top macroblock of the macroblock pair region to the left of the predetermined macroblock pair region, if the macroblock pair region to the left is of the field coded distribution type, or if the macroblock pair region to the left is of the frame coded distribution type with the predetermined macroblock being the top macroblock of the predetermined macroblock pair region and;

a neighboring macroblock to the top of the predetermined macroblock at least based upon as to whether the predetermined macroblock pair region is of a frame or field coded distribution type such that if the predetermined macroblock pair region is of the frame coded distribution type the neighboring macroblock to the top of the predetermined macroblock is determined to be a top macroblock of the predetermined macroblock pair region if the predetermined macroblock is the bottom macroblock of the predetermined macroblock pair region, and a bottom macroblock of the macroblock pair region to the top of the predetermined macroblock pair region if the predetermined macroblock is the top macroblock of the predetermined macroblock pair region, if the predetermined macroblock pair region is of the field coded distribution type and the predetermined macroblock is the top macroblock of the predetermined macroblock pair region, the neighboring macroblock to the top of the predetermined macroblock is determined to be the bottom macroblock of the macroblock pair region to the top of the predetermined macroblock pair region, if the macroblock pair region to the top of the predetermined macroblock pair region is of the frame coded distribution type, the top macroblock of the macroblock pair region to the top of the predetermined macroblock pair region, if the macroblock pair region to the top of the predetermined macroblock pair region is of the field coded distribution type, if the predetermined macroblock pair region is of the field coded distribution type and the predetermined macroblock is the bottom macroblock of the predetermined macroblock pair region, the neighboring macroblock to the top of the predetermined macroblock is determined to be the bottom macroblock of the macroblock pair region to the top of the predetermined macroblock pair region;

assigning one of at least two context models to the predetermined syntax element of the predetermined macroblock based on a predetermined attribute of the neighboring macroblock to the left of the predetermined macroblock and the neighboring macroblock to the top of the predetermined macroblock, wherein each context model is associated with a different probability estimation; and arithmetically decoding the predetermined syntax element from the coded bit stream based on the probability estimation with which the assigned context model is associated.

3. The non-transitory computer readable digital storage medium in accordance with claim 2, wherein the assignment of the pixel samples is such that, in accordance with the frame coded distribution type, pixel samples lying in an upper part of the respective macroblock pair region are assigned to the top macroblock and pixel samples lying in a lower part of the respective macroblock pair region are assigned to the bottom macroblock, whereas, in accordance with the field coded distribution type, pixel samples in the respective macroblock pair region belonging to the first field are assigned to the top macroblock and pixel samples in the respective macroblock pair region belonging to the second field are assigned to the bottom macroblock.

4. The non-transitory computer readable digital storage medium in accordance with claim 3, wherein the pixel samples belonging to the first field and the pixel samples belonging to the second field are interlaced row-wise so that pixel samples assigned to the top and bottom macroblock of a respective macroblock pair region in accordance with the field coded distribution type have a greater pitch in row direction than pixel samples assigned to the top and bottom macroblock of a respective macroblock pair region in accordance with the frame coded distribution type.

5. The non-transitory computer readable digital storage medium in accordance with claim 2, wherein the step of arithmetically decoding comprises:

binary arithmetically decoding a sequence of the binary decisions belonging to the predetermined syntax element, wherein, at least for a predetermined part of the binary decisions, the decoding is based on the probability estimation with which the assigned context model is associated; and reconstructing the syntax element from the sequence of binary decisions.

6. The non-transitory computer readable digital storage medium according to claim 2, wherein the step of assigning one of at least two context models is performed such that the assignment is also based on an availability of the neighboring macroblock to the left and the neighboring macroblock to the top of the predetermined macroblock indicating as to whether the predetermined macroblock and the respective neighboring macroblocks belong to the same slice of the video frame or to different slices of the video frame, respectively.

7. The non-transitory computer readable digital storage medium according to claim 2, wherein the step of assigning one of at least two context models is performed such that the assignment is based on a macroblock type indicator of the neighboring macroblock, specifying a macroblock prediction mode and a partitioning of the neighboring macroblock used for prediction.

8. The non-transitory computer readable digital storage medium according to claim 2, wherein the step of assigning one of at least two context models is performed such that the assignment is based on the neighboring macroblock to the left and the neighboring macroblock to the top of the predetermined macroblock being inter or intra coded in the coded bit stream.

9. The non-transitory computer readable digital storage medium according to claim 2, wherein the step of assigning one of at least two context models is performed such that the assignment is based on a syntax element specifying, for a neighboring partition of the neighboring macroblock to the left and the neighboring macroblock to the top of the predetermined macroblock, an index of a reference picture.

10. The non-transitory computer readable digital storage medium according to claim 2, wherein the step of assigning one of at least two context models is performed such that the assignment is based on an availability of the neighboring macroblock to the left and the neighboring macroblock to the top of the predetermined macroblock, indicating as to whether the predetermined macroblock and the respective neighboring macroblock belong to the same slice of the video frame or to different slices of the video frame, a macroblock type indicator of the neighboring macroblock to the left and the neighboring macroblock to the top of the predetermined macroblock, specifying a macroblock prediction mode and a partitioning of the respective neighboring macroblock used for prediction, the neighboring macroblock to the left and the neighboring macroblock to the top of the predetermined macroblock being inter or intra coded in the coded bit stream, and a syntax element specifying, for a neighboring partition of the neighboring macroblock to the left and the neighboring macroblock to the top of the predetermined macroblock, an index of a reference picture.

11. The non-transitory computer readable digital storage medium according to claim 2, wherein the step of determining is performed such that the determination results in a selection among the top and bottom macroblock of macroblock pair region to the left of the predetermined macroblock pair region that is also effectively dependent on the predetermined partition residing within a lower or upper part of the predetermined macroblock.

12. A non-transitory computer readable digital storage medium having stored thereon a computer program having a program code for performing, when running on a computer, a method for encoding a video signal representing at least one video frame, with the at least one video frame being composed of picture samples, the picture samples belonging either to a first or a second field being captured at different time instants, the video frame being spatially divided up into macroblock pair regions, each macroblock pair region being associated with a top and bottom macroblock, the method comprising the following steps being performed by an encoder:

deciding, for each macroblock pair region, as to whether the respective macroblock pair region is of a frame coded or a field coded distribution type;

assigning, for each macroblock pair region, each of the pixel samples in the respective macroblock pair region to a respective one of the top and bottom macroblock of the respective macroblock pair region, in accordance with the distribution type of the respective macroblock pair region;

pre-coding the video signal into a pre-coded video signal, including motion prediction of the macroblocks to obtain, for each macroblock, a syntax element specifying, for current respective macroblock, an index of a reference picture;

determining, for the syntax element of a current macroblock associated with a current macroblock pair region of the macroblock pair regions, a neighboring macroblock to the left of the current macroblock comprising a neighboring partition of the pre-determined partition, at least based upon as to whether the current macroblock pair region is of the frame or field coded distribution type such that if the current macroblock pair region is of the field coded distribution type, the neighboring macroblock to the left of the current macroblock is determined to be a bottom macroblock of a macroblock pair region to the left of the current macroblock pair region, if the macroblock pair region to the left is also of the field coded distribution type and the current macroblock is the bottom macroblock of the current macroblock pair region, and the neighboring macroblock to the left of the current macroblock is determined to be a top macroblock of the macroblock pair region to the left of the current macroblock pair region, if the macroblock pair region to the left is of the frame coded distribution type, or if the macroblock pair region to the left is of the field coded distribution type with the current macroblock being the top macroblock of the current macroblock pair region, and if the current macroblock pair region is of the frame coded distribution type, the neighboring macroblock to the left of the current macroblock is determined to be the bottom macroblock of the macroblock pair region to the left of the current macroblock pair region, if the macroblock pair region to the left is also of the frame coded distribution type and the current macroblock is the bottom macroblock of the current macroblock pair region, and the neighboring macroblock to the left of the current macroblock is determined to be the top macroblock of the macroblock pair region to the left of the current macroblock pair region, if the macroblock pair region to the left is of the field coded distribution type, or if the macroblock pair region to the left is of the frame coded distribution type with the current macroblock being the top macroblock of the current macroblock pair region and;

a neighboring macroblock to the top of the current macroblock at least based upon as to whether the current macroblock pair region is of a frame or field coded distribution type such that if the current macroblock pair region is of the frame coded distribution type the neighboring macroblock to the top of the current macroblock is determined to be a top macroblock of the current macroblock pair region if the current macroblock is the bottom macroblock of the current macroblock pair region, and a bottom macroblock of the macroblock pair region to the top of the current macroblock pair region if the current macroblock is the top macroblock of the current macroblock pair region, if the current macroblock pair region is of the field coded distribution type and the current macroblock is the top macroblock of the current macroblock pair region, the neighboring macroblock to the top of the current macroblock is determined to be the bottom macroblock of the macroblock pair region to the top of the current macroblock pair region, if the macroblock pair region to the top of the current macroblock pair region is of the frame coded distribution type, the top macroblock of the macroblock pair region to the top of the current macroblock pair region, if the macroblock pair region to the top of the current macroblock pair region is of the field coded distribution type, if the current macroblock pair region is of the field coded distribution type and the current macroblock is the bottom macroblock of the current macroblock pair region, the neighboring macroblock to the top of the current macroblock is determined to be the bottom macroblock of the macroblock pair region to the top of the current macroblock pair region, assigning one of at least two context models to the current syntax element of the current macroblock based on a pre-determined attribute of the neighboring macroblock to the left of the current macroblock and the neighboring macroblock to the top of the current macroblock, wherein each context model is associated with a different probability estimation; and arithmetically encoding the syntax element of the current macroblock into a coded bit stream based on the probability estimation with which the assigned context model is associated.

13. A non-transitory computer readable digital storage medium having stored thereon a computer program having a program code for performing, when running on a computer, a method for decoding a predetermined syntax element among syntax elements of a coded bit stream from the coded bit stream, the coded bit stream being an arithmetically encoded version of a pre-coded video signal, the pre-coded video signal being a pre-coded version of a video signal, the video signal representing at least one video frame being composed of picture samples, the picture samples belonging either to a first or a second field being captured at a different time instants, the video frame being spatially divided up into macroblock pair regions, each macroblock pair region being associated with a top and a bottom macroblock, each macroblock pair region being either of a frame coded or a field coded distribution type, wherein, for each macroblock pair region, each of the pixel samples in the respective macroblock pair region is assigned to a respective one of the top and bottom macroblock of the respective macroblock pair region in accordance with the distribution type of the respective macroblock pair region, wherein each of the macroblocks is associated with a respective one of the syntax elements, the predetermined syntax element relating to a predetermined macroblock of the top and bottom macroblock of a predetermined macroblock pair region of the macroblock pair regions, and specifying, for the predetermined macroblock, an index of a reference picture used in motion prediction of the predetermined macroblock, wherein the method comprises the following steps being performed by a decoder:

determining, for the predetermined syntax element, a neighboring macroblock to the left of the predetermined macroblock at least based upon as to whether the predetermined macroblock pair region is of the frame or field coded distribution type such that if the predetermined macroblock pair region is of the field coded distribution type, the neighboring macroblock to the left of the predetermined macroblock is determined to be a bottom macroblock of a macroblock pair region to the left of the predetermined macroblock pair region, if the macroblock pair region to the left is also of the field coded distribution type and the predetermined macroblock is the bottom macroblock of the predetermined macroblock pair region, and the neighboring macroblock to the left of the predetermined macroblock is determined to be a top macroblock of the macroblock pair region to the left of the predetermined macroblock pair region, if the macroblock pair region to the left is of the frame coded distribution type, or if the macroblock pair region to the left is of the field coded distribution type with the predetermined macroblock being the top macroblock of the predetermined macroblock pair region, and if the predetermined macroblock pair region is of the frame coded distribution type, the neighboring macroblock to the left of the predetermined macroblock is determined to be the bottom macroblock of the macroblock pair region to the left of the predetermined macroblock pair region, if the macroblock pair region to the left is also of the frame coded distribution type and the predetermined macroblock is the bottom macroblock of the predetermined macroblock pair region, and the neighboring macroblock to the left of the predetermined macroblock is determined to be the top macroblock of the macroblock pair region to the left of the predetermined macroblock pair region, if the macroblock pair region to the left is of the field coded distribution type, or if the macroblock pair region to the left is of the frame coded distribution type with the predetermined macroblock being the top macroblock of the predetermined macroblock pair region and;

a neighboring macroblock to the top of the predetermined macroblock at least based upon as to whether the predetermined macroblock pair region is of a frame or field coded distribution type such that if the predetermined macroblock pair region is of the frame coded distribution type the neighboring macroblock to the top of the predetermined macroblock is determined to be a top macroblock of the predetermined macroblock pair region if the predetermined macroblock is the bottom macroblock of the predetermined macroblock pair region, and a bottom macroblock of the macroblock pair region to the top of the predetermined macroblock pair region if the predetermined macroblock is the top macroblock of the predetermined macroblock pair region, if the predetermined macroblock pair region is of the field coded distribution type and the predetermined macroblock is the top macroblock of the predetermined macroblock pair region, the neighboring macroblock to the top of the predetermined macroblock is determined to be the bottom macroblock of the macroblock pair region to the top of the predetermined macroblock pair region, if the macroblock pair region to the top of the predetermined macroblock pair region is of the frame coded distribution type, the top macroblock of the macroblock pair region to the top of the predetermined macroblock pair region, if the macroblock pair region to the top of the predetermined macroblock pair region is of the field coded distribution type, if the predetermined macroblock pair region is of the field coded distribution type and the predetermined macroblock is the bottom macroblock of the predetermined macroblock pair region, the neighboring macroblock to the top of the predetermined macroblock is determined to be the bottom macroblock of the macroblock pair region to the top of the predetermined macroblock pair region;

assigning one of at least two context models to the predetermined syntax element of the predetermined macroblock based on a predetermined attribute of the neighboring macroblock to the left of the predetermined macroblock and the neighboring macroblock to the top of the predetermined macroblock, wherein each context model is associated with a different probability estimation; and arithmetically decoding the predetermined syntax element from the coded bit stream based on the probability estimation with which the assigned context model is associated.

* * * * *